US012662645B2

(12) United States Patent
Katou et al.

(10) Patent No.: US 12,662,645 B2
(45) Date of Patent: Jun. 23, 2026

(54) REFRIGERATION CYCLE APPARATUS, REFRIGERATING MACHINE OIL AND REFRIGERANT LEAKAGE PREVENTION AGENT

(71) Applicant: DAIKIN INDUSTRIES, LTD., Osaka (JP)

(72) Inventors: Taketo Katou, Osaka (JP); Akinari Sugiyama, Osaka (JP); Takamune Okui, Osaka (JP); Sadayasu Inagaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 947 days.

(21) Appl. No.: 17/849,421

(22) Filed: Jun. 24, 2022

(65) Prior Publication Data

US 2022/0333032 A1 Oct. 20, 2022

Related U.S. Application Data

(63) Continuation of application No. PCT/JP2020/017971, filed on Apr. 27, 2020.

(30) Foreign Application Priority Data

Dec. 25, 2019 (JP) ................................ 2019-235055

(51) Int. Cl.

| | |
|---|---|
| ***C10M 107/38*** | (2006.01) |
| ***C09K 5/04*** | (2006.01) |
| ***C10N 40/30*** | (2006.01) |

(52) U.S. Cl.

CPC ........... *C10M 107/38* (2013.01); *C09K 5/041* (2013.01); *C10M 2213/0623* (2013.01); *C10N 2040/30* (2013.01)

(58) Field of Classification Search

CPC ........ C10M 107/38; C10M 2213/0623; C10M 171/008; C10M 2213/062; C10M 171/06;

(Continued)

(56) References Cited

U.S. PATENT DOCUMENTS

| | | |
|---|---|---|
| 5,744,539 A | 4/1998 | McCoy et al. |
| 6,475,406 B1 | 11/2002 | Bowers |

(Continued)

FOREIGN PATENT DOCUMENTS

| | | |
|---|---|---|
| CN | 104169408 A | 11/2014 |
| JP | 2005-146031 A | 6/2005 |

(Continued)

OTHER PUBLICATIONS

International Search Report for PCT/JP2020/017971 dated Aug. 4, 2020 [PCT/ISA/210].

(Continued)

*Primary Examiner* — Andrew J. Oyer
(74) *Attorney, Agent, or Firm* — Sughrue Mion, PLLC

(57) ABSTRACT

A refrigeration cycle apparatus, refrigerating machine oil and refrigerant leakage prevention agent. The refrigeration cycle apparatus contains a working fluid which contains a refrigerant composition including a refrigerant and a refrigerating machine oil including resin particles of which $D_{50}$ and $D_{90}/D_{10}$ are 2.0 μm to 10.0 μm and 4.0 to 14.0, respectively.

2 Claims, 1 Drawing Sheet

(58) Field of Classification Search
CPC ...... C09K 5/041; C09K 3/12; C09K 2205/12; C09K 2205/126; C09K 5/045; C10N 2040/30; C10N 2020/06; F25B 13/00; F25B 31/002; F25B 2500/221; F25B 41/40
See application file for complete search history.

(56) References Cited

U.S. PATENT DOCUMENTS

| | | | | |
|---|---|---|---|---|
| 6,476,120 | B1 * | 11/2002 | Bowers | C09K 5/045 524/463 |
| 8,754,176 | B2 * | 6/2014 | Yamanaka | C08F 114/26 526/89 |
| 2012/0101214 | A1 | 4/2012 | Yamanaka et al. | |
| 2015/0038381 | A1 | 2/2015 | Matsumoto et al. | |

FOREIGN PATENT DOCUMENTS

| | | | |
|---|---|---|---|
| JP | 2009-236401 | A | 10/2009 |
| JP | 2011-075221 | A | 4/2011 |
| WO | 2010/114033 | A1 | 10/2010 |

OTHER PUBLICATIONS

International Preliminary Report on Patentability with Translation of Written Opinion dated Jun. 28, 2022 in International Application No. PCT/JP2020/017971.
Extended European Search Report dated Dec. 15, 2023 in corresponding Application No. 20905024.4.

* cited by examiner

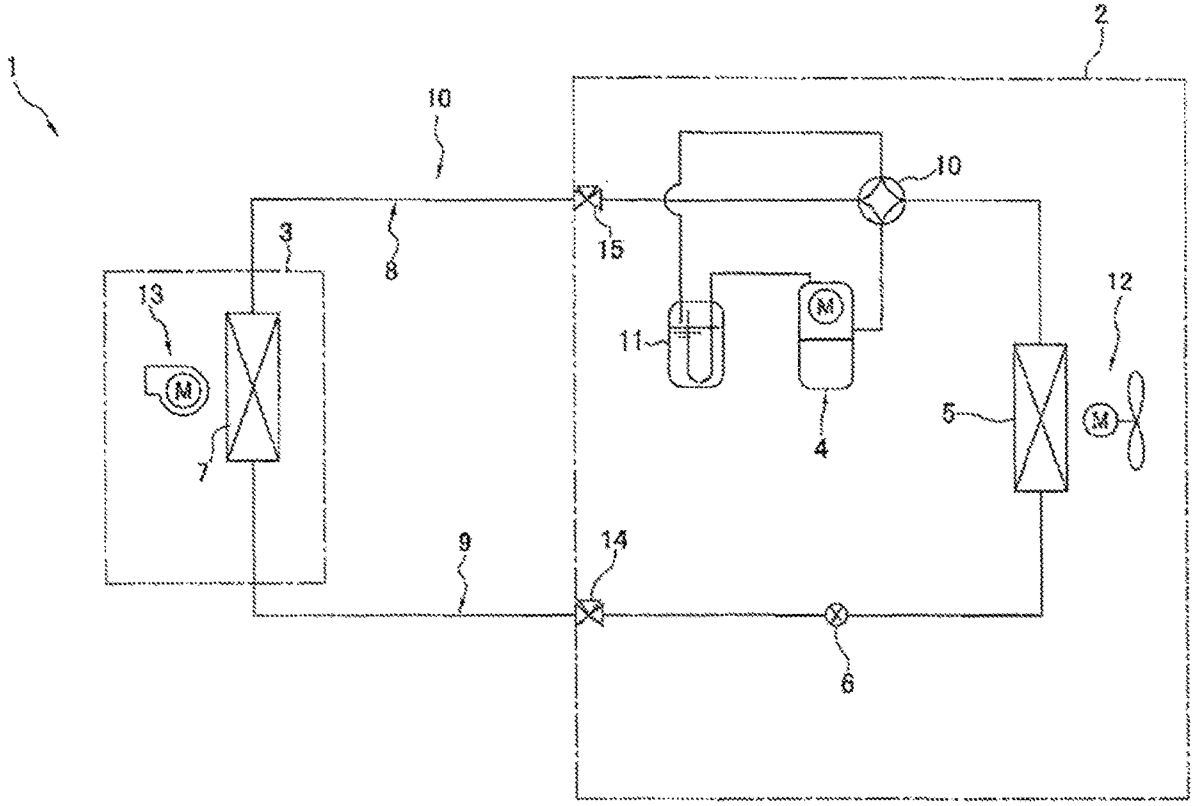
1
2
10
10
3
8
15
13
11
4
12
5
7
9
14
6

REFRIGERATION CYCLE APPARATUS, REFRIGERATING MACHINE OIL AND REFRIGERANT LEAKAGE PREVENTION AGENT

CROSS REFERENCE TO RELATED APPLICATIONS

This is a Rule 53(b) Continuation of International Application No. PCT/JP2020/017971 filed Apr. 27, 2020, claiming priority from Japanese Patent Application No. 2019-235055 filed Dec. 25, 2019, the respective disclosures of which are incorporated herein by reference in their entirety.

TECHNICAL FIELD

The present disclosure relates to a refrigeration cycle apparatus, a refrigerator oil (i.e. refrigerating machine oil), and a refrigerant leakage prevention agent.

BACKGROUND ART

The following Patent Literature 1 aims at providing a refrigeration apparatus designed to block through holes with a hole diameter of 10 μm or less and a method for injecting a sealant in the refrigeration apparatus, and discloses the use of fine particles with an average particle diameter of 0.05 to 5.00 μm as the fine particles for sealing. It is described that this refrigeration apparatus and the method for injecting a sealant in the refrigeration apparatus enable a more reliable and more stable sealing for a longer period of time compared to conventional cases.

CITATION LIST

Patent Literature

Patent Literature 1: JP 2011-75221 A

SUMMARY

There has been a need to further reduce the refrigerant leakage ratio, and the present disclosure aims to provide a novel refrigeration cycle apparatus, refrigerator oil, and refrigerant leakage prevention agent.

The present disclosure includes the following embodiments.

[1] A refrigeration cycle apparatus comprising a working fluid for a refrigerator, the working fluid comprising:

a refrigerator oil comprising resin particles having a $D_{50}$ of 2.0 μm to 10.0 μm and a $D_{90}/D_{10}$ of 4.0 to 14.0; and a refrigerant composition comprising a refrigerant.

[2] The refrigeration cycle apparatus according to the above [1], wherein the resin particles have a standard deviation of 3.0 μm to 8.0 μm.

[3] The refrigeration cycle apparatus according to the above [1] or [2], wherein the resin particles are fluorine-containing resin particles.

[4] The refrigeration cycle apparatus according to the above [3], wherein the fluorine-containing resin particles are polytetrafluoroethylene particles.

[5] A refrigerator oil comprising resin particles having a $D_{50}$ of 2.0 μm to 10.0 μm and a $D_{90}/D_{10}$ of 4.0 to 14.0 μm.

[6] The refrigerator oil according to the above [5], wherein the resin particles have a standard deviation of 3.0 μm to 8.0 μm.

[7] The refrigerator oil according to the above [5] or [6], wherein the resin particles are fluorine-containing resin particles.

[8] The refrigerator oil according to the above [7], wherein the fluorine-containing resin particles are polytetrafluoroethylene particles.

[9] A refrigerant leakage prevention agent comprising the refrigerator oil according to any one of the above [5] to [8].

The refrigeration cycle apparatus and refrigerator oil of the present disclosure can further reduce the refrigerant leakage ratio by containing resin particles with a relatively wide particle size distribution. In addition, the refrigerant leakage prevention agent of the present disclosure can be injected into a refrigeration cycle apparatus, for example, before its operation, thereby bringing about the refrigeration cycle apparatus of the present disclosure.

BRIEF DESCRIPTION OF DRAWING

The FIGURE shows an example of a refrigerant circuit that a refrigeration cycle apparatus has.

DESCRIPTION OF EMBODIMENTS

From now on, embodiments for implementing the present disclosure will be described in detail.

(1) Refrigeration Cycle Apparatus

A refrigeration cycle apparatus of the present disclosure comprises a refrigerant composition, which will be described in Item (4) below, and a refrigerator oil.

(2) Refrigerator Oil

The refrigerator oil can enhance the lubricity in the refrigeration cycle apparatus by carrying out a refrigeration cycle, such as a refrigeration cycle in coexistence with the refrigerant composition, and can also allow efficient cycle performance to be demonstrated.

Examples of the refrigerator oil include oxygen-containing synthetic oils (ester refrigerator oils, ether refrigerator oils, and the like), and hydrocarbon refrigerator oils. Among the above, ester refrigerator oils and ether refrigerator oils are preferable from the viewpoint of miscibility with the refrigerant or refrigerant composition. As the refrigerator oil, one kind of refrigerator oil may be used alone, or two or more kinds of refrigerator oils may be used in combination.

From at least any one of the following viewpoints: suppressing reduction in lubricity and sealability of the compressor; ensuring sufficient miscibility with the refrigerant under low temperature conditions; suppressing poor lubrication of the compressor; and making the heat exchange efficiency in the evaporator good, the refrigerator oil preferably has a kinematic viscosity at 40° C. of 1 $mm^2/s$ or more and 750 $mm^2/s$ or less, and more preferably 1 $mm^2/s$ or more and 400 $mm^2/s$ or less. Note that the kinematic viscosity of the refrigerator oil at 100° C. may be, for example, 1 $mm^2/s$ or more and 100 $mm^2/s$ or less, and it is more preferably 1 $mm^2/s$ or more and 50 $mm^2/s$ or less.

The refrigerator oil preferably has an aniline point of −100° C. or higher and 0° C. or lower. The "aniline point" here is a numerical value that indicates the solubility of hydrocarbon solvents and the like, for example, and represents a temperature at which, when a sample (in this case, refrigerator oil) is mixed with an equal volume of aniline and chilled, the two cannot be dissolved in each other and turbidity begins to appear (specified in JIS K 2256). Note that this value is for the refrigerator oil itself in a state where no refrigerant is dissolved. By using a refrigerator oil with such an aniline point, even when, for example, each bearing and insulating materials of electric motor constituting the resin functional components are used at locations in contact with the refrigerator oil, the compatibility of the refrigerator oil to these resin functional components can be improved. Specifically, when the aniline point is too low, the refrigerator oil easily permeates through the bearings and insulating materials, which makes it easier for the bearings and other materials to be swollen. On the other hand, when the aniline point is too high, it becomes difficult for the refrigerator oil to permeate through the bearings and insulating materials, which makes it easier for the bearings and other materials to be contracted. Therefore, by using a refrigerator oil whose aniline point is in the predetermined range (−100° C. or higher and 0° C. or lower) mentioned above, swelling/contraction deformation of the bearings and insulating materials can be prevented. Here, when each bearing is swollen and deformed, it becomes impossible to maintain the gap at the sliding section to the desired length. As a result, there is a risk of leading to increase in sliding resistance. When each bearing is contracted and deformed, the hardness of the bearing is increased and there is a risk that vibration of the compressor may damage the bearing. That is, when each bearing is contracted and deformed, there is a risk of leading to reduction in the rigidity of the sliding section. In addition, when the insulating materials of electric motor (insulating coating materials, insulating films, and the like) are swollen and deformed, the insulating properties of those insulating materials are degraded. When the insulating materials are contracted and deformed, there is a risk that the insulating materials may be damaged, as in the case of the bearings mentioned above, and in this case as well, the insulating properties are degraded. In contrast, when using a refrigerator oil whose aniline point is within the predetermined range as described above, such defects can be avoided because the swelling/contraction deformation of bearings and insulating materials can be suppressed.

The refrigerator oil is mixed with the refrigerant composition and used as a working fluid for a refrigerator. The mixing ratio of the refrigerator oil relative to the entire amount of working fluid for a refrigerator is preferably 5% by mass or more and 60% by mass or less, and more preferably 10% by mass or more and 50% by mass or less.

(2-1) Oxygen-Containing Synthetic Oil

Ester refrigerator oils and ether refrigerator oils, which are oxygen-containing synthetic oils, have and are mainly composed of carbon atoms and oxygen atoms. In ester refrigerator oils and ether refrigerator oils, when the ratio of carbon atoms to oxygen atoms (carbon/oxygen molar ratio) is too small, the moisture absorption properties are increased, and when that ratio is too large, the miscibility with the refrigerant is reduced, and therefore, that ratio is preferably 2 or more and 7.5 or less in molar ratio.

(2-1-1) Ester Refrigerator Oil

As for the ester refrigerator oil, from the viewpoint of chemical stability, mention may be made of dibasic acid ester oils of a dibasic acid and a monohydric alcohol, polyol ester oils of a polyol and a fatty acid or complex ester oils of a polyol, a polybasic acid, and a monohydric alcohol (or fatty acid), polyol carbonate ester oils, and the like as the base oil component.

(Dibasic Acid Ester Oil)

As the dibasic acid ester oil, preferable are esters of a dibasic acid such as oxalic acid, malonic acid, succinic acid, glutaric acid, adipic acid, pimelic acid, suberic acid, azelaic acid, sebacic acid, phthalic acid, isophthalic acid, or terephthalic acid, in particular, a dibasic acid having 5 to 10 carbon atoms (such as glutaric acid, adipic acid, pimelic acid, suberic acid, azelaic acid, or sebacic acid) and a monohydric alcohol with 1 to 15 carbon atoms having a linear or branched alkyl group (such as methanol, ethanol, propanol, butanol, pentanol, hexanol, heptanol, octanol, nonanol, decanol, undecanol, dodecanol, tridecanol, tetradecanol, or pentadecanol). Specific examples of these dibasic acid ester oils include ditridecyl glutarate, di(2-ethylhexyl) adipate, diisodecyl adipate, ditridecyl adipate, and di(3-ethylhexyl) sebacate.

(Polyol Ester Oil)

The polyol ester oil is an ester synthesized from a polyhydric alcohol and a fatty acid (carboxylic acid), and has a carbon/oxygen molar ratio of 2 or more and 7.5 or less, preferably 3.2 or more and 5.8 or less.

Examples of the polyhydric alcohol that constitutes the polyol ester oil include diols (such as ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol) and polyols having 3 to 20 hydroxyl groups (including polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to trimer of glycerin), 1,3,5-pentanetriol, sorbitol, sorbitan, sorbitol glycerin condensate, adonitol, arabitol, xylitol, and mannitol, saccharides such as xylose, arabinose, ribose, rhamnose, glucose, fructose, galactose, mannose, sorbose, cellobiose, maltose, isomaltose, trehalose, sucrose, raffinose, gentianose, and melezitose, and partially etherified products thereof), and the polyhydric alcohol that constitutes the ester may be one kind of the above, or may contain two or more kinds.

As the fatty acid that constitutes the polyol ester, there is no limitation on the number of carbon atoms, but those having 1 to 24 carbon atoms are normally used. Linear fatty acids and branched fatty acids are preferable. Examples of the linear fatty acid include acetic acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, linoleic acid, and linolenic acid, and the hydrocarbon group bonded to the carboxyl group may be a fully saturated hydrocarbon or it may have an unsaturated hydrocarbon. Furthermore, examples of the branched fatty acid include 2-methylpropanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 2,2,3-trimethylbutanoic acid, 2,3,3-trimethylbutanoic acid, 2-ethyl-2-methylbutanoic acid, 2-ethyl-3-methylbutanoic acid, 2-methylheptanoic acid, 3-methylheptanoic acid, 4-methylheptanoic acid, 5-methylheptanoic acid, 6-methylheptanoic acid, 2-ethylhexanoic acid, 3-ethylhexanoic acid, 4-ethylhexanoic acid, 2,2-dimethylhexanoic acid, 2,3-dimethylhexanoic acid, 2,4-dimethylhexanoic acid, 2,5-dimethylhexanoic acid, 3,3-dimethylhexanoic acid, 3,4-dimethylhexanoic acid, 3,5-dimethylhexanoic acid, 4,4-dimethylhexanoic acid, 4,5-dimethylhexanoic acid, 5,5-dimethylhexanoic acid, 2-propylpentanoic acid, 2-methyloctanoic acid, 3-methyloctanoic acid, 4-methyloctanoic acid, 5-methyloctanoic acid, 6-methyloctanoic acid, 7-methyloctanoic acid, 2,2-dimethylheptanoic acid, 2,3-dimethylheptanoic acid, 2,4-dimethylheptanoic acid, 2,5-dimethylheptanoic acid, 2,6-dimethylheptanoic acid, 3,3-dimethylheptanoic acid, 3,4-dimethylheptanoic acid, 3,5-dimethylheptanoic acid, 3,6-dimethylheptanoic acid, 4,4-dimethylheptanoic acid, 4,5-dimethylheptanoic acid, 4,6-dimethylheptanoic acid, 5,5-dimethylheptanoic acid, 5,6-dimethylheptanoic acid, 6,6-dimethylheptanoic acid, 2-methyl-2-ethylhexanoic acid, 2-methyl-3-ethylhexanoic acid, 2-methyl-4-ethylhexanoic acid, 3-methyl-2-ethylhexanoic acid, 3-methyl-3-ethylhexanoic acid, 3-methyl-4-ethylhexanoic acid, 4-methyl-2-ethylhexanoic acid, 4-methyl-3-ethylhexanoic acid, 4-methyl-4-ethylhexanoic acid, 5-methyl-2-ethylhexanoic acid, 5-methyl-3-ethylhexanoic acid, 5-methyl-4-ethylhexanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid. The fatty acid may be an ester with one kind of fatty acid or two or more kinds of fatty acids selected from among the above.

The polyhydric alcohol that constitutes the ester may be one kind or a mixture of two or more kinds. Also, the fatty acid that constitutes the ester may be a single component or an ester with two or more kinds of fatty acids. The fatty acids may each be one kind or a mixture of two or more kinds. In addition, the polyol ester oil may have a free hydroxyl group.

As a specific polyol ester oil, esters of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferable, esters of neopentyl glycol, trimethylolethane, trimethylolpropane, trimethylolbutane, pentaerythritol, and di-(pentaerythritol) are even more preferable, and esters of neopentyl glycol, trimethylolpropane, pentaerythritol, di-(pentaerythritol), and the like with a fatty acid having 2 to 20 carbon atoms are preferable.

For such a fatty acid that constitutes the polyhydric alcohol fatty acid ester, the fatty acid may only be a fatty acid having a linear alkyl group, or it may be selected from fatty acids having a branched structure. Alternatively, it may be a mixed ester of linear and branched fatty acids. Furthermore, for the fatty acid that constitutes the ester, two or more kinds selected from the above fatty acids may be used.

As a specific example, in the case of a mixed ester of linear and branched fatty acids, the molar ratio between the linear fatty acid having 4 to 6 carbon atoms and the branched fatty acid having 7 to 9 carbon atoms is 15:85 to 90:10, preferably 15:85 to 85:15, more preferably 20:80 to 80:20, still more preferably 25:75 to 75:25, and most preferably 30:70 to 70:30. Also, the proportion of the total of the linear fatty acid having 4 to 6 carbon atoms and the branched fatty acid having 7 to 9 carbon atoms to the entire amount of fatty acids that constitute the polyhydric alcohol fatty acid ester is preferably 20% by mole or more. The compositional features of the fatty acid are preferably those that achieve both sufficient miscibility with the refrigerant and viscosity required for the refrigerator oil. Note that the proportion of fatty acids here is a value based on the entire amount of fatty acids that constitute the polyhydric alcohol fatty acid ester contained in the refrigerator oil.

Especially, as such a refrigerator oil, preferable is one containing an ester (hereinafter, referred to as a "polyhydric alcohol fatty acid ester (A)") in which the molar ratio between the fatty acid having 4 to 6 carbon atoms and the branched fatty acid having 7 to 9 carbon atoms in the fatty acid is 15:85 to 90:10, the fatty acid having 4 to 6 carbon atoms contains 2-methylpropanoic acid, and the proportion of the total of the fatty acid having 4 to 6 carbon atoms and the branched fatty acid having 7 to 9 carbon atoms to the entire amount of fatty acids that constitute the above ester is 20% by mole or more.

The polyhydric alcohol fatty acid ester (A) encompasses complete esters in which all hydroxyl groups of the polyhydric alcohol are esterified, partial esters in which some hydroxyl groups of the polyhydric alcohol remain unesterified, and mixtures of complete esters and partial esters, but the hydroxyl value of the polyhydric alcohol fatty acid ester (A) is preferably 10 mg-KOH/g or less, still more preferably 5 mg-KOH/g or less, and most preferably 3 mg-KOH/g or less.

In the fatty acid that constitutes the polyhydric alcohol fatty acid ester (A), the molar ratio between the fatty acid having 4 to 6 carbon atoms and the branched fatty acid having 7 to 9 carbon atoms is 15:85 to 90:10, preferably 15:85 to 85:15, more preferably 20:80 to 80:20, still more preferably 25:75 to 75:25, and most preferably 30:70 to 70:30. Also, the proportion of the total of the fatty acid having 4 to 6 carbon atoms and the branched fatty acid having 7 to 9 carbon atoms to the entire amount of fatty acids that constitute the polyhydric alcohol fatty acid ester (A) is 20% by mole or more. When the above conditions with respect to the compositional features of the fatty acid are not met, in the case where difluoromethane is contained in the refrigerant composition, it becomes difficult to achieve both sufficient miscibility with that difluoromethane and viscosity required for the refrigerator oil at high levels. Note that the proportion of fatty acids is a value based on the entire amount of fatty acids that constitute the polyhydric alcohol fatty acid ester contained in the refrigerator oil.

Specific examples of the above fatty acid having 4 to 6 carbon atoms include butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid. Among the above, those having a branch in the alkyl skeleton, such as 2-methylpropanoic acid, are preferable.

Specific examples of the above branched fatty acid having 7 to 9 carbon atoms include 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoic acid, 1-ethyl-1-methylbutanoic acid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5-trimethylhexanoic acid, 2-ethyl-2,3,3-trimethylbutyric acid, 2,2,4,4-tetramethylpentanoic acid, 2,2,3,3-tetramethylpentanoic acid, 2,2,3,4-tetramethylpentanoic acid, and 2,2-diisopropylpropanoic acid.

In the polyhydric alcohol fatty acid ester (A), the molar ratio between the fatty acid having 4 to 6 carbon atoms and the branched fatty acid having 7 to 9 carbon atoms is 15:85 to 90:10, and as long as the fatty acid having 4 to 6 carbon atoms contains 2-methylpropanoic acid, a fatty acid other than the fatty acid having 4 to 6 carbon atoms and the branched fatty acid having 7 to 9 carbon atoms may be contained as a constituent acid component.

Specific examples of the above fatty acid other than the fatty acid having 4 to 6 carbon atoms and the branched fatty acid having 7 to 9 carbon atoms include fatty acids having 2 to 3 carbon atoms such as acetic acid and propionic acid; linear fatty acids having 7 to 9 carbon atoms such as heptanoic acid, octanoic acid, and nonanoic acid; and fatty acids having 10 to 20 carbon atoms such as decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, and oleic acid.

When the above fatty acid having 4 to 6 carbon atoms and branched fatty acid having 7 to 9 carbon atoms are used in combination with a fatty acid other than these fatty acids, the proportion of the total of the fatty acid having 4 to 6 carbon atoms and the branched fatty acid having 7 to 9 carbon atoms to the entire amount of fatty acids that constitute the polyhydric alcohol fatty acid ester (A) is preferably 20% by mole or more, more preferably 25% by mole or more, and still more preferably 30% by mole or more. When this proportion is 20% by mole or more, in the case where difluoromethane is contained in the refrigerant composition, the miscibility with that difluoromethane is sufficient.

Among the polyhydric alcohol fatty acid ester (A), those in which the acid constituent consists only of 2-methylpropanoic acid and 3,5,5-trimethylhexanoic acid are particularly preferable in terms of both ensuring the required viscosity and, in the case where difluoromethane is contained in the refrigerant composition, miscibility with that difluoromethane.

The above polyhydric alcohol fatty acid ester may be a mixture of two or more kinds of esters with different molecular structures, and in such a case, the individual molecules do not necessarily need to meet the above conditions, and the above conditions only need to be met as the whole fatty acid that constitutes the pentaerythritol fatty acid ester contained in the refrigerator oil.

As described above, the polyhydric alcohol fatty acid ester (A) requires the fatty acid having 4 to 6 carbon atoms and the branched fatty acid having 7 to 9 carbon atoms as the acid component that constitutes the ester, and includes another fatty acid as a constituent if required. That is, the polyhydric alcohol fatty acid ester (A) may have only two kinds of fatty acids as the acid constituent or three or more kinds of fatty acids with different structures as the acid constituent, but it is preferable that the polyhydric alcohol fatty acid ester contains as the acid constituent only fatty acids whose carbon atom adjacent to the carbonyl carbon (α-position carbon atom) are not a quaternary carbon. When a fatty acid whose α-position carbon atom is a quaternary carbon is contained in the fatty acid that constitutes the polyhydric alcohol fatty acid ester, in the case where difluoromethane is contained in the refrigerant composition, the lubricity in the presence of that difluoromethane tends to be insufficient.

Also, as the polyhydric alcohol that constitutes the polyol ester according to the present embodiment, polyhydric alcohols having 2 to 6 hydroxyl groups are preferably used.

Specific examples of dihydric alcohols (diols) include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Also, specific examples of trihydric or higher alcohols include polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to trimer of glycerin), 1,3,5-pentanetriol, sorbitol, sorbitan, sorbitol glycerin condensate, adonitol, arabitol, xylitol, and mannitol, saccharides such as xylose, arabinose, ribose, rhamnose, glucose, fructose, galactose, mannose, sorbose, and cellobiose, and partially etherified products thereof. Among the above, due to their superior hydrolytic stability, esters of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol) are more preferable, esters of neopentyl glycol, trimethylolethane, trimethylolpropane, trimethylolbutane, pentaerythritol, and di-(pentaerythritol) are even more preferable, neopentyl glycol, trimethylolpropane, pentaerythritol, and di-(pentaerythritol) are still more preferable, and because of particularly excellent miscibility with the refrigerant and hydrolytic stability, pentaerythritol, di-(pentaerythritol), or a mixed ester of pentaerythritol and di-(pentaerythritol) is most preferable.

Preferred examples of the acid constituent that constitutes the above polyhydric alcohol fatty acid ester (A) may include the following:

(i) a combination of one to thirteen kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to thirteen kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of one to twenty-five kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to twenty-five kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2, 3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of one to fifty kinds selected from butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and hexanoic acid, with one to fifty kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

Further preferred examples of the acid constituent that constitutes the above polyhydric alcohol fatty acid ester may include the following:

(i) a combination of 2-methylpropanoic acid with one to thirteen kinds selected from 2-methylhexanoic acid, 3-methylhexanoic acid, 4-methylhexanoic acid, 5-methylhexanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, and 2-ethyl-3-methylbutanoic acid;

(ii) a combination of 2-methylpropanoic acid with one to twenty-five kinds selected from 2-methylheptanoic acid, 3-methylheptanoic acid, 4-methylheptanoic acid, 5-methylheptanoic acid, 6-methylheptanoic acid, 2,2-dimethylhexanoic acid, 3,3-dimethylhexanoic acid, 4,4-dimethylhexanoic acid, 5,5-dimethylhexanoic acid, 2,3-dimethylhexanoic acid, 2,4-dimethylhexanoic acid, 2,5-dimethylhexanoic acid, 3,4-dimethylhexanoic acid, 3,5-dimethylhexanoic acid, 4,5-dimethylhexanoic acid, 2,2,3-trimethylpentanoic acid, 2,3,3-trimethylpentanoic acid, 2,4,4-trimethylpentanoic acid, 3,4,4-trimethylpentanoic acid, 2-ethylhexanoic acid, 3-ethylhexanoic acid, 2-propylpentanoic acid, 2-methyl-2-ethylpentanoic acid, 2-methyl-3-ethylpentanoic acid, and 3-methyl-3-ethylpentanoic acid; and (iii) a combination of 2-methylpropanoic acid with one to fifty kinds selected from 2-methyloctanoic acid, 3-methyloctanoic acid, 4-methyloctanoic acid, 5-methyloctanoic acid, 6-methyloctanoic acid, 7-methyloctanoic acid, 8-methyloctanoic acid, 2,2-dimethylheptanoic acid, 3,3-dimethylheptanoic acid, 4,4-dimethylheptanoic acid, 5,5-dimethylheptanoic acid, 6,6-dimethylheptanoic acid, 2,3-dimethylheptanoic acid, 2,4-dimethylheptanoic acid, 2,5-dimethylheptanoic acid, 2,6-dimethylheptanoic acid, 3,4-dimethylheptanoic acid, 3,5-dimethylheptanoic acid, 3,6-dimethylheptanoic acid, 4,5-dimethylheptanoic acid, 4,6-dimethylheptanoic acid, 2-ethylheptanoic acid, 3-ethylheptanoic acid, 4-ethylheptanoic acid, 5-ethylheptanoic acid, 2-propylhexanoic acid, 3-propylhexanoic acid, 2-butylpentanoic acid, 2,2,3-trimethylhexanoic acid, 2,2,3-trimethylhexanoic acid, 2,2,4-trimethylhexanoic acid, 2,2,5-trimethylhexanoic acid, 2,3,4-trimethylhexanoic acid, 2,3,5-trimethylhexanoic acid, 3,3,4-trimethylhexanoic acid, 3,3,5-trimethylhexanoic acid, 3,5,5-trimethylhexanoic acid, 4,4,5-trimethylhexanoic acid, 4,5,5-trimethylhexanoic acid, 2,2,3,3-tetramethylpentanoic acid, 2,2,3,4-tetramethylpentanoic acid, 2,2,4,4-tetramethylpentanoic acid, 2,3,4,4-tetramethylpentanoic acid, 3,3,4,4-tetramethylpentanoic acid, 2,2-diethylpentanoic acid, 2,3-diethylpentanoic acid, 3,3-diethylpentanoic acid, 2-ethyl-2,3,3-trimethylbutyric acid, 3-ethyl-2,2,3-trimethylbutyric acid, and 2,2-diisopropylpropionic acid.

The content of the above polyhydric alcohol fatty acid ester (A) is 50% by mass or more, preferably 60% by mass or more, more preferably 70% by mass or more, and still more preferably 75% by mass or more, based on the entire amount of the refrigerator oil. As will be mentioned later, the refrigerator oil according to the present embodiment may contain a lubricating oil base oil or additive agent other than the polyhydric alcohol fatty acid ester (A), but when the content of the polyhydric alcohol fatty acid ester (A) is less than 50% by mass, it becomes impossible to achieve both required viscosity and miscibility at high levels.

In the refrigerator oil according to the present embodiment, the polyhydric alcohol fatty acid ester (A) is mainly used as the base oil. As the base oil of the refrigerator oil according to the present embodiment, only the polyhydric alcohol fatty acid ester (A) may be used alone (that is, the content of the polyhydric alcohol fatty acid ester (A) is 100% by mass), but in addition to this, a base oil other than the polyhydric alcohol fatty acid ester (A) may be further contained to the extent that its excellent performance is not impaired. Examples of the base oil other than the polyhydric alcohol fatty acid ester (A) include hydrocarbon oils such as mineral oils, olefin polymers, alkyldiphenylalkanes, alkylnaphthalenes, and alkylbenzenes; esters other than the polyhydric alcohol fatty acid ester (A) such as polyol esters, complex esters, and alicyclic dicarboxylate esters; and oxygen-containing synthetic oils such as polyglycols, polyvinyl ethers, ketones, polyphenyl ethers, silicones, polysiloxanes, and perfluoroethers (hereinafter, sometimes referred to as "other oxygen-containing synthetic oils").

As the other oxygen-containing synthetic oils, among the above, esters other than the polyhydric alcohol fatty acid ester (A), polyglycols, polyvinyl ethers are preferable, and polyol esters other than the polyhydric alcohol fatty acid ester (A) are particularly preferable. Examples of polyol esters other than the polyhydric alcohol fatty acid ester (A) include esters of a polyhydric alcohol such as neopentyl glycol, trimethylolethane, trimethylolpropane, trimethylolbutane, pentaerythritol, and dipentaerythritol, with a fatty acid, and particularly preferable are esters of neopentyl glycol with a fatty acid, esters of pentaerythritol with a fatty acid, and esters of dipentaerythritol with a fatty acid.

The neopentyl glycol esters are preferably esters of neopentyl glycol with a fatty acid having 5 to 9 carbon atoms. Specific examples of such neopentyl glycol esters include neopentyl glycol di-3,5,5-trimethylhexanoate, neopentyl glycol di-2-ethylhexanoate, neopentyl glycol di-2-methylhexanoate, neopentyl glycol di-2-ethylpentanoate, esters of neopentyl glycol with 2-methylhexanoic acid and 2-ethylpentanoic acid, esters of neopentyl glycol with 3-methylhexanoic acid and 5-methylhexanoic acid, esters of neopentyl glycol with 2-methylhexanoic acid and 2-ethylhexanoic acid, esters of neopentyl glycol with 3,5-dimethylhexanoic acid, 4,5-dimethylhexanoic acid, and 3,4-dimethylhexanoic acid, neopentyl glycol dipentanoate, neopentyl glycol di-2-ethylbutanoate, neopentyl glycol di-2-methylpentanoate, neopentyl glycol di-2-methylbutanoate, and neopentyl glycol di-3-methylbutanoate.

The pentaerythritol esters are preferably esters of pentaerythritol with a fatty acid having 5 to 9 carbon atoms. Specific examples of such pentaerythritol esters include esters of pentaerythritol with one or more kinds of fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

The dipentaerythritol esters are preferably esters of dipentaerythritol with a fatty acid having 5 to 9 carbon atoms. Specific examples of such dipentaerythritol esters include esters of dipentaerythritol with one or more kinds of fatty acids selected from pentanoic acid, 2-methylbutanoic acid, 3-methylbutanoic acid, hexanoic acid, 2-methylpentanoic acid, 2-ethylbutanoic acid, 2-ethylpentanoic acid, 2-methylhexanoic acid, 3,5,5-trimethylhexanoic acid, and 2-ethylhexanoic acid.

When the refrigerator oil according to the present embodiment contains an oxygen-containing synthetic oil other than the polyhydric alcohol fatty acid ester (A), the content of the oxygen-containing synthetic oil other than the polyhydric alcohol fatty acid ester (A) is not limited as long as the excellent lubricity and miscibility of the refrigerator oil according to the present embodiment are not impaired; however, when a polyol ester other than the polyhydric alcohol fatty acid ester (A) is compounded, its content is preferably less than 50% by mass, more preferably 45% by mass or less, still more preferably 40% by mass or less, even more preferably 35% by mass or less, further preferably 30% by mass or less, and most preferably 25% by mass or less, based on the entire amount of the refrigerator oil, and when an oxygen-containing synthetic oil other than polyol esters is compounded, its content is preferably less than 50% by mass, more preferably 40% by mass or less, and still more preferably 30% by mass or less, based on the entire amount of the refrigerator oil. When the amount of a polyol ester or other oxygen-containing synthetic oil other than pentaerythritol fatty acid esters to be compounded is too large, the above effects cannot be achieved sufficiently.

Note that the polyol ester other than the polyhydric alcohol fatty acid ester (A) may be a partial ester in which some hydroxyl groups of the polyhydric alcohol remain as hydroxyl groups without being esterified, a complete ester in which all hydroxyl groups are esterified, or a mixture of a partial ester and a complete ester, but its hydroxyl value is preferably 10 mg-KOH/g or less, more preferably 5 mg-KOH/g or less, and most preferably 3 mg-KOH/g or less.

When the refrigerator oil and working fluid for a refrigerator according to the present embodiment contain a polyol ester other than the polyhydric alcohol fatty acid ester (A), as that polyol ester, they may contain a polyol ester made up of one kind of polyol ester with a single structure, or a mixture of two or more kinds of polyol esters with different structures.

Also, the polyol ester other than the polyhydric alcohol fatty acid ester (A) may be any of an ester of one kind of fatty acid with one kind of polyhydric alcohol, an ester of two or more kinds of fatty acids with one kind of polyhydric alcohol, an ester of one kind of fatty acid with two or more kinds of polyhydric alcohols, and an ester of two or more kinds of fatty acids with two or more kinds of polyhydric alcohols.

The refrigerator oil according to the present embodiment may consist only of the polyhydric alcohol fatty acid ester (A) or may consist of the polyhydric alcohol fatty acid ester (A) and another base oil, but it may further contain various additive agents, which will be mentioned later. The working fluid for a refrigerator according to the present embodiment may also further contain various additive agents. Note that, in the following description, the content of additive agents is shown based on the entire amount of the refrigerator oil, but it is desirable to select the content of these components in the working fluid for a refrigerator such that it is within the preferred range, which will be mentioned later, when based on the entire amount of the refrigerator oil.

In order to further improve the abrasion resistance and load resistance of the refrigerator oil and working fluid for a refrigerator according to the present embodiment, at least one phosphorus compound selected from the group consisting of phosphate esters, acidic phosphate esters, thiophosphate esters, amine salts of acidic phosphate esters, chlorinated phosphate esters, and phosphite esters can be compounded. These phosphorus compounds are esters of phosphoric acid or phosphite with alkanols or polyether-type alcohols, or derivatives thereof.

Specific examples of phosphate esters include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyl diphenyl phosphate, and xylenyl diphenyl phosphate.

Examples of acidic phosphate esters include monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, and dioleyl acid phosphate.

Examples of thiophosphate esters include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate, and xylenyl diphenyl phosphorothionate.

Examples of amine salts of acidic phosphate esters include amine salts of acidic phosphate esters and amines of primary to tertiary linear or branched alkyl groups having 1 to 24, preferably 5 to 18 carbon atoms.

Examples of amines that constitute the amine salts of acidic phosphate esters include salts with linear or branched amines such as methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, oleylamine, tetracosylamine, dimethylamine, diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadecylamine, dioctadecylamine, dioleylamine, ditetracosylamine, trimethylamine, triethylamine, tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trioleylamine, and tritetracosylamine. The amine may be a single compound or a mixture of two or more kinds of compounds.

Examples of chlorinated phosphate esters include tris-dichloropropyl phosphate, tris-chloroethyl phosphate, tris-chlorophenyl phosphate, and polyoxyalkylene-bis[di(chloroalkyl)]phosphate. Examples of phosphite esters include dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite. A mixture of the above can also be used.

When the refrigerator oil and working fluid for a refrigerator according to the present embodiment contain the above phosphorus compound, the content of the phosphorus compound is not limited, but it is preferably 0.01 to 5.0% by mass and more preferably 0.02 to 3.0% by mass, based on the entire amount of the refrigerator oil (based on the total amount of the base oil and all compounded additive agents). Note that the above phosphorus compounds may be used alone as one kind, or two or more kinds may be used in combination.

In addition, to the refrigerator oil and working fluid for a refrigerator according to the present embodiment, a terpene compound can be added in order to further improve their heat and chemical stabilities. The term "terpene compound" in the present disclosure refers to a compound in which isoprene is polymerized or a derivative thereof, and the dimer to octamer of isoprene is preferably used. Specific examples of the terpene compound include monoterpenes such as geraniol, nerol, linalool, citral (including geranial), citronellol, menthol, limonene, terpineol, carvone, ionone, thujone, camphor, and borneol; sesquiterpenes such as farnesene, farnesol, nerolidol, juvenile hormone, humulene, caryophyllene, elemene, cadinol, cadinene, and tutin; diterpenes such as geranylgeraniol, phytol, abietic acid, pimaradiene, daphnetoxin, taxol, and pimaric acid; sesterterpenes such as geranylfarnesene; triterpenes such as squalene, limonin, camelliagenin, hopane, and lanosterol; and tetraterpenes such as carotenoid.

Among these terpene compounds, monoterpenes, sesquiterpenes, and diterpenes are preferable, sesquiterpenes are more preferable, and α-farnesene (3,7,11-trimethyldodeca-1,3,6,10-tetraene) and/or β-farnesene (7,11-dimethyl-3-methylidenedodeca-1,6,10-triene) are particularly preferable. In the present disclosure, one kind of terpene compound may be used alone, or two or more kinds of terpene compounds may be used in combination.

The content of the terpene compound in the refrigerator oil according to the present embodiment is not limited, but it is preferably 0.001 to 10% by mass, more preferably 0.01 to 5% by mass, and still more preferably 0.05 to 3% by mass, based on the entire amount of the refrigerator oil. When the content of the terpene compound is less than 0.001% by mass, the effects of improving heat and chemical stabilities tend to be insufficient, and when the content is greater than 10% by mass, the lubricity tends to be insufficient. Also, as for the content of the terpene compound in the working fluid for a refrigerator according to the present embodiment, it is desirable to select it so as to be within the above preferred range when based on the entire amount of the refrigerator oil.

In addition, in order to further improve their heat and chemical stabilities, the refrigerator oil and working fluid for a refrigerator according to the present embodiment can contain at least one epoxy compound selected from phenyl glycidyl ether-type epoxy compounds, alkyl glycidyl ether-type epoxy compounds, glycidyl ester-type epoxy compounds, allyloxirane compounds, alkyloxirane compounds, alicyclic epoxy compounds, epoxidized fatty acid monoesters, and epoxidized vegetable oils.

As for the phenyl glycidyl ether-type epoxy compounds, specifically, phenyl glycidyl ether or alkylphenyl glycidyl ethers can be exemplified. Examples of the alkylphenyl glycidyl ethers referred to here include those with 1 to 3 alkyl groups having 1 to 13 carbon atoms, and among them, those with one alkyl group having 4 to 10 carbon atoms can be exemplified as preferred ones, such as n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, and decylphenyl glycidyl ether.

As for the alkyl glycidyl ether-type epoxy compounds, specifically, decyl glycidyl ether, undecyl glycidyl ether, dodecyl glycidyl ether, tridecyl glycidyl ether, tetradecyl glycidyl ether, 2-ethylhexyl glycidyl ether, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, polyalkylene glycol diglycidyl ether, and the like can be exemplified.

Specific examples of the glycidyl ester-type epoxy compounds include phenyl glycidyl ester, alkyl glycidyl esters, and alkenyl glycidyl esters, and glycidyl-2,2-dimethyl octanoate, glycidyl benzoate, glycidyl acrylate, glycidyl methacrylate, and the like can be exemplified as preferred ones.

As for the allyloxirane compounds, specifically, 1,2-epoxystyrene, alkyl-1,2-epoxystyrene, and the like can be exemplified.

As for the alkyloxirane compounds, specifically, 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane 1,1,2-epoxyoctadecane, 2-epoxynonadecane, 1,2-epoxyicosan, and the like can be exemplified.

As for the alicyclic epoxy compounds, specifically, 1,2-epoxycyclohexane, 1,2-epoxycyclopentane, 3,4-epoxycyclohexylmethyl-3,4-epoxycyclohexane carboxylate, bis(3,4-epoxycyclohexylmethyl) adipate, exo-2,3-epoxynorbornane, bis(3,4-epoxy-6-methylcyclohexylmethyl) adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane, 4-epoxyethyl-1,2-epoxycyclohexane, and the like can be exemplified.

As for the epoxidized fatty acid monoesters, specifically, esters of epoxidized fatty acids having 12 to 20 carbon atoms with alcohols having 1 to 8 carbon atoms, phenol, or alkylphenols can be exemplified. In particular, butyl, hexyl, benzyl, cyclohexyl, methoxyethyl, octyl, phenyl, and butylphenyl esters of epoxystearic acid are preferably used.

As for the epoxidized vegetable oils, specifically, epoxy compounds of vegetable oils such as soybean oil, linseed oil, and cottonseed oil, and the like can be exemplified.

Among these epoxy compounds, preferable are phenyl glycidyl ether-type epoxy compounds, alkyl glycidyl ether-type epoxy compounds, glycidyl ester-type epoxy compounds, and alicyclic epoxy compounds.

When the refrigerator oil and working fluid for a refrigerator according to the present embodiment contain the above epoxy compound, the content of the epoxy compound is not limited, but it is preferably 0.01 to 5.0% by mass and more preferably 0.1 to 3.0% by mass, based on the entire amount of the refrigerator oil. Note that the above epoxy compounds may be used alone as one kind, or two or more kinds may be used in combination.

Note that the kinematic viscosity of the refrigerator oil containing the polyhydric alcohol fatty acid ester (A) at 40° C. can be preferably 20 to 80 $mm^2/s$, more preferably 25 to 75 $mm^2/s$, and most preferably 30 to 70 $mm^2/s$. Also, the kinematic viscosity at 100° C. can be preferably 2 to 20 $mm^2/s$ and more preferably 3 to 10 $mm^2/s$. When the kinematic viscosity is at or above the aforementioned lower limit value, it is easy to ensure a viscosity required as a refrigerator oil, whereas, when the kinematic viscosity is at or below the aforementioned upper limit value, in the case where difluoromethane is contained as a refrigerant composition, the miscibility with that difluoromethane can be made sufficient.

Also, the volume resistivity of the refrigerator oil containing the polyhydric alcohol fatty acid ester (A) is not limited, but it can be preferably $1.0\times10^{12}$ Ω·cm or more, more preferably $1.0\times10^{13}$ Ω·cm or more, and most preferably $1.0\times10^{14}$ Ω·cm or more. In particular, when used for sealed refrigerators, high electrical insulating properties tend to be required. Note that the volume resistivity means a value at 25° C. measured in accordance with JIS C 2101 "Testing methods of electrical insulating oils".

Also, the content of moisture of the refrigerator oil containing the polyhydric alcohol fatty acid ester (A) is not limited, but it can be preferably 200 ppm or less, more preferably 100 ppm or less, and most preferably 50 ppm or less, based on the entire amount of the refrigerator oil. In particular, when used for sealed refrigerators, the content of moisture is required to be low from the viewpoint of impacts on the heat and chemical stabilities and electrical insulating properties of the refrigerator oil.

Also, the acid value of the refrigerator oil containing the polyhydric alcohol fatty acid ester (A) is not limited, but it can be preferably 0.1 mg-KOH/g or less and more preferably 0.05 mg-KOH/g or less, in order to prevent corrosion of metals used in the refrigerator or pipe. Note that, in the present disclosure, the acid value means an acid value measured in accordance with JIS K 2501 "Petroleum products and lubricants—Determination of neutralization number".

Also, the ash content of the refrigerator oil containing the polyhydric alcohol fatty acid ester (A) is not limited, but it can be preferably 100 ppm or less and more preferably 50 ppm or less, in order to enhance the heat and chemical stabilities of the refrigerator oil and to suppress the occurrence of sludge and the like. Note that the ash content means a value of ash content measured in accordance with JIS K 2272, "Crude oil and petroleum products—Determination of ash and sulfated ash".

(Complex Ester Oil)

Complex ester oils are esters of a fatty acid and a dibasic acid with a monohydric alcohol and a polyol. As for the fatty acid, dibasic acid, monohydric alcohol, and polyol, the same ones as mentioned above can be used.

Examples of the fatty acid include those listed for the fatty acid of the above polyol ester.

Examples of the dibasic acid include oxalic acid, malonic acid, succinic acid, glutaric acid, adipic acid, pimelic acid, suberic acid, azelaic acid, sebacic acid, phthalic acid, isophthalic acid, and terephthalic acid.

Examples of the polyol include those listed as the polyhydric alcohol of the above polyol ester. The complex ester is an ester of these fatty acid, dibasic acid, and polyol, each of which may be a single component or may be made up of multiple components.

(Polyol Carbonate Ester Oil)

Polyol carbonate ester oils are esters of carbonic acid and a polyol.

Examples of the polyol include the same diols and polyols as mentioned above.

Also, the polyol carbonate ester oil may be a ring-opened polymer of a cyclic alkylene carbonate.

(2-1-2) Ether Refrigerator Oil

As for the ether refrigerator oil, mention may be made of polyvinyl ether oils, polyoxyalkylene oils, and the like.

(Polyvinyl Ether Oil)

Examples of the polyvinyl ether oil include polymers of a vinyl ether monomer, copolymers of a vinyl ether monomer and a hydrocarbon monomer having an olefinic double bond, and copolymers of a monomer having an olefinic double bond and a polyoxyalkylene chain and a vinyl ether monomer.

The carbon/oxygen molar ratio of the polyvinyl ether oil is preferably 2 or more and 7.5 or less and more preferably 2.5 or more and 5.8 or less. When the carbon/oxygen molar ratio is lower than the above range, the moisture absorption properties are increased, and when it is higher than the above range, the miscibility is reduced. Also, the weight average molecular weight of the polyvinyl ether is preferably 200 or more and 3,000 or less and more preferably 500 or more and 1,500 or less.

The polyvinyl ether oil preferably has a pour point of −30° C. or lower. The polyvinyl ether oil preferably has a surface tension at 20° C. of 0.02 N/m or more and 0.04 N/m or less. The polyvinyl ether oil preferably has a density at 15° C. of 0.8 g/cm$^3$ or more and 1.8 g/cm$^3$ or less. The polyvinyl ether oil preferably has a saturated moisture content of 2000 ppm or more at a temperature of 30° C. and a relative humidity of 90%.

In the refrigerator oil, the polyvinyl ether may be contained as the main component. When the refrigerant contains HFO-1234yf, the polyvinyl ether, which is the main component of the refrigerator oil, has miscibility with that HFO-1234yf, and when the kinematic viscosity of the refrigerator oil at 40° C. is 400 mm$^2$/s or less, HFO-1234yf is dissolved in the refrigerator oil to some extent. Also, when the pour point of the refrigerator oil is −30° C. or lower, it is easy to ensure the flowability of the refrigerator oil even at a site in the refrigerant circuit where the refrigerant composition or refrigerator oil is at a low temperature. In addition, when the surface tension of the refrigerator oil at 20° C. is 0.04 N/m or less, the refrigerator oil discharged from the compressor is less likely to become large oil droplets that are difficult to be pushed away by the refrigerant composition. Therefore, the refrigerator oil discharged from the compressor is dissolved in HFO-1234yf and is easily returned to the compressor together with HFO-1234yf.

Also, when the kinematic viscosity of the refrigerator oil at 40° C. is 30 mm$^2$/s or more, the lubricating performance can be easily ensured because insufficient oil film strength is prevented due to a too low kinematic viscosity. In addition, when the surface tension of the refrigerator oil at 20° C. is 0.02 N/m or more, it is difficult for the refrigerator oil to become small oil droplets in the gas refrigerant inside the compressor, and it is possible to prevent a large amount of the refrigerator oil from being discharged from the compressor. This makes it easy to ensure a sufficient amount of the refrigerator oil to be stored in the compressor.

Also, when the saturated moisture content of the refrigerator oil is 2,000 ppm or more at a temperature of 30° C. and a relative humidity of 90%, the moisture absorption properties of the refrigerator oil can be made relatively high. This means that, when the refrigerant contains HFO-1234yf, the moisture in HFO-1234yf can be captured to some extent by the refrigerator oil. HFO-1234yf has a molecular structure that is susceptible to alteration/deterioration due to the impact of moisture contained therein. Therefore, the moisture absorption effects by the refrigerator oil can suppress such deterioration.

Furthermore, in the case where a predetermined resin functional component is arranged in a sealing section or sliding section that can come into contact with the refrigerant flowing through the refrigerant circuit, and where that resin functional component is constituted of any of polytetrafluoroethylene, polyphenylene sulfide, phenolic resin, polyamide resin, chloroprene rubber, silicon rubber, hydrogenated nitrile rubber, fluoroelastomer, and hydrin rubber, as for the aniline point of the refrigerator oil, it is preferable to set its numerical range in consideration of the compatibility with the resin functional component. By setting the aniline point in this way, for example, the compatibility of the refrigerator oil with bearings that constitute the resin functional component is improved. Specifically, when the aniline point is too low, the refrigerator oil easily permeates through the bearings and the like, which makes it easier for the bearings and the like to be swollen. On the other hand, when the aniline point is too high, it becomes difficult for the refrigerator oil to permeate through the bearings and the like, which makes it easier for the bearings and the like to be contracted. Therefore, by setting the aniline point of the refrigerator oil to the predetermined numerical range, swelling/contraction deformation of the bearings and the like can be prevented. Here, when each bearing or the like undergoes swelling/shrinkage deformation, for example, it becomes impossible to maintain the gap at the sliding section to the desired length. As a result, there is a risk of leading to increase in the sliding resistance and reduction in the rigidity of the sliding section. However, by setting the aniline point of the refrigerator oil to the predetermined numerical range as described above, such defects can be avoided because the swelling/shrinkage deformation of the bearings and the like is suppressed.

As the vinyl ether monomer, one kind of vinyl ether monomer may be used alone, or two or more kinds of vinyl ether monomers may be used in combination. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. As the hydrocarbon monomer having an olefinic double bond, one kind of hydrocarbon monomer may be used alone, or two or more kinds of hydrocarbon monomers may be used in combination.

The polyvinyl ether copolymer may be either a block or random copolymer. As the polyvinyl ether oil, one kind of polyvinyl ether oil may be used alone, or two or more kinds of polyvinyl ether oils may be used in combination.

A polyvinyl ether oil that is preferably used has structural units represented by the following general formula (1):

[Formula 1]

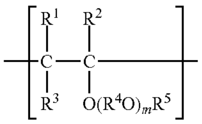

(1)

(In the formula, $R^1$, $R^2$, and $R^3$ may be the same as or different from each other, and each represent a hydrogen atom or a hydrocarbon group having 1 to 8 carbon atoms; $R^4$ represents a divalent hydrocarbon group having 1 to 10 carbon atoms or a divalent ether bond oxygen-containing hydrocarbon group having 2 to 20 carbon atoms; $R^5$ represents a hydrocarbon group having 1 to 20 carbon atoms; m is a number such that the average value of m for the above polyvinyl ether is 0 to 10; $R^1$ to $R^5$ may be the same as or different from each other for each structural unit; and when m is 2 or more in one structural unit, multiple $R^4O$ may be the same or different.)

As for $R^1$, $R^2$, and $R^3$ in the above general formula (1), it is preferable that at least one of them is a hydrogen atom, and in particular, all of them are hydrogen atoms. In the general formula (1), m is preferably 0 or more and 10 or less, particularly 0 or more and 5 or less, and furthermore 0. $R^5$ in the general formula (1) represents a hydrocarbon group having 1 to 20 carbon atoms, but specifically, this hydrocarbon group represents any of alkyl groups including a methyl group, an ethyl group, a n-propyl group, an isopropyl group, a n-butyl group, an isobutyl group, a sec-butyl group, a tert-butyl group, various pentyl groups, various hexyl groups, various heptyl groups, and various octyl groups; cycloalkyl groups including a cyclopentyl group, a cyclohexyl group, various methylcyclohexyl groups, various ethylcyclohexyl groups, and various dimethylcyclohexyl groups; aryl groups including a phenyl group, various methylphenyl groups, various ethylphenyl groups, and various dimethylphenyl groups; and arylalkyl groups including a benzyl group, various phenylethyl groups, and various methylbenzyl groups. Note that, among alkyl groups, cycloalkyl groups, phenyl groups, aryl groups, and arylalkyl groups, alkyl groups, in particular alkyl groups having 1 to 5 carbon atoms, are preferable. Note that it is preferable for the above polyvinyl ether oil to contain a polyvinyl ether oil in which $R^5$ is an alkyl group having 1 or 2 carbon atoms and a polyvinyl ether oil in which $R^5$ is an alkyl group having 3 or 4 carbon atoms at a ratio of 40%:60% to 100%:0%.

The polyvinyl ether oil in the present embodiment may be a homopolymer in which structural units represented by the general formula (1) are the same, or it may be a copolymer constituted of two or more kinds of structural units. The copolymer may be either a block copolymer or a random copolymer.

The polyvinyl ether oil according to the present embodiment may be constituted only of structural units represented by the above general formula (1), but it may also be a copolymer that further contains structural units represented by the following general formula (2). In this case, the copolymer may be either a block copolymer or a random copolymer.

[Formula 2]

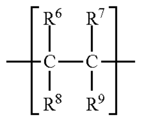

(2)

(In the formula, $R^6$ to $R^9$ may be the same as or different from each other, and each represent a hydrogen atom or a hydrocarbon group having 1 to 20 carbon atoms.)

Examples of the vinyl ether monomer include a compound of the following general formula (3):

[Formula 3]

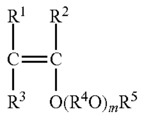

(3)

(In the formula, $R^1$, $R^2$, $R^3$, $R^4$, $R^5$ and m have the same definitions as $R^1$, $R^2$, $R^3$, $R^4$, $R^5$ and m in the general formula (1), respectively.)

There are various vinyl ether monomers corresponding to the above polyvinyl ether compound, but examples thereof include vinyl methyl ether; vinyl ethyl ether; vinyl n-propyl ether; vinyl isopropyl ether; vinyl n-butyl ether; vinyl isobutyl ether; vinyl sec-butyl ether; vinyl tert-butyl ether; vinyl n-pentyl ether; vinyl n-hexyl ether; vinyl 2-methoxyethyl ether; vinyl 2-ethoxyethyl ether; vinyl 2-methoxy-1-methylethyl ether; vinyl 2-methoxy-propyl ether; vinyl 3,6-dioxaheptyl ether; vinyl 3,6,9-trioxadecyl ether; vinyl 1,4-dimethyl-3,6-dioxaheptyl ether; vinyl 1,4,7-trimethyl-3,6,9-trioxadecyl ether; vinyl 2,6-dioxa-4-heptyl ether; vinyl 2,6,9-trioxa-4-decyl ether; 1-methoxypropene; 1-ethoxypropene; 1-n-propoxypropene; 1-isopropoxypropene; 1-n-butoxypropene; 1-isobutoxypropene; 1-sec-butoxypropene; 1-tert-butoxypropene; 2-methoxypropene; 2-ethoxypropene; 2-n-propoxypropene; 2-isopropoxypropene; 2-n-butoxypropene; 2-isobutoxypropene; 2-sec-butoxypropene; 2-tert-butoxypropene; 1-methoxy-1-butene; 1-ethoxy-1-butene; 1-n-propoxy-1-butene; 1-isopropoxy-1-butene; 1-n-butoxy-1-butene; 1-isobutoxy-1-butene; 1-sec-butoxy-1-butene; 1-tert-butoxy-1-butene; 2-methoxy-1-butene; 2-ethoxy-1-butene; 2-n-propoxy-1-butene; 2-isopropoxy-1-butene; 2-n-butoxy-1-butene; 2-isobutoxy-1-butene; 2-sec-butoxy-1-butene; 2-tert-butoxy-1-butene; 2-methoxy-2-butene; 2-ethoxy-2-butene; 2-n-propoxy-2-butene; 2-isopropoxy-2-butene; 2-n-butoxy-2-butene; 2-isobutoxy-2-butene; 2-sec-butoxy-2-butene; and 2-tert-butoxy-2-butene. These vinyl ether monomers can be produced by publicly known methods.

As for the polyvinyl ether compound having constituent units represented by the above general formula (1), its ends can be converted to the desired structure by the method shown in the present disclosure example and other publicly known methods. As for the groups to which they are converted, examples thereof may include saturated hydrocarbons, ethers, alcohols, ketones, amides, and nitriles.

The polyvinyl ether compound preferably has the following end structure:

[Formula 4]

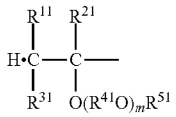

(4)

(In the formula, $R^{11}$, $R^{21}$, and $R^{31}$ may be the same as or different from each other, and each represent a hydrogen atom or a hydrocarbon group having 1 to 8 carbon atoms; $R^{41}$ represents a divalent hydrocarbon group having 1 to 10 carbon atoms or a divalent ether bond oxygen-containing hydrocarbon group having 2 to 20 carbon atoms; $R^{51}$ represents a hydrocarbon group having 1 to 20 carbon atoms; m is a number such that the average value of m for the polyvinyl ether is 0 to 10; and when m is 2 or more, multiple $R^{41}0$ may be the same or different.)

[Formula 5]

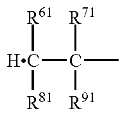

(5)

(In the formula, $R^{61}$, $R^{71}$, $R^{81}$, and $R^{91}$ may be the same as or different from each other, and each represent a hydrogen atom or a hydrocarbon group having 1 to 20 carbon atoms.)

[Formula 6]

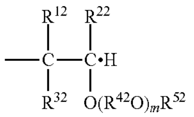

(6)

In the formula, $R^{12}$, $R^{22}$, and $R^{32}$ may be the same as or different from each other, and each represent a hydrogen atom or a hydrocarbon group having 1 to 8 carbon atoms; $R^{42}$ represents a divalent hydrocarbon group having 1 to 10 carbon atoms or a divalent ether bond oxygen-containing hydrocarbon group having 2 to 20 carbon atoms; $R^{52}$ represents a hydrocarbon group having 1 to 20 carbon atoms; m is a number such that the average value of m for the polyvinyl ether is 0 to 10; and when m is 2 or more, multiple $R^{42}O$ may be the same or different.)

[Formula 7]

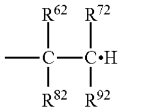

(7)

(In the formula, $R^{62}$, $R^{72}$, $R^{82}$, and $R^{92}$ may be the same as or different from each other, and each represent a hydrogen atom or a hydrocarbon group having 1 to 20 carbon atoms.)

[Formula 8]

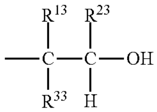

(8)

(In the formula, $R^{13}$, $R^{23}$, and $R^{33}$ may be the same as or different from each other, and each represent a hydrogen atom or a hydrocarbon group having 1 to 8 carbon atoms.)

The polyvinyl ether oil in the present embodiment can be produced by radical polymerization, cationic polymerization, radiation polymerization, or the like of the monomers described above. After completion of the polymerization reaction, the polyvinyl ether compound having the target structural units represented by the general formula (1) can be obtained by performing usual separation and purification methods as required.

(Polyoxyalkylene Oil)

Examples of the polyoxyalkylene oil include polyoxyalkylene compounds obtained by a method such as polymerizing alkylene oxides having 2 to 4 carbon atoms (ethylene oxide, propylene oxide, or the like) with water or a hydroxyl group-containing compound as an initiator. It may also be one in which hydroxyl groups of a polyoxyalkylene compound have been etherified or esterified. The oxyalkylene units in the polyoxyalkylene oil may be the same in one molecule, or two or more kinds of oxyalkylene units may be contained. It is preferable that at least oxypropylene units are contained in one molecule.

Specific examples of the polyoxyalkylene oil include a compound represented by the following general formula (9):

$$R^{101}—[(OR^{102})_k—OR^{103}]_l \quad (9)$$

(In the formula, $R^{101}$ represents a hydrogen atom, an alkyl group having 1 to 10 carbon atoms, an acyl group having 2 to 10 carbon atoms, or an aliphatic hydrocarbon group having 1 to 10 carbon atoms with 2 to 6 bonding links; $R^{102}$ represents an alkylene group having 2 to 4 carbon atoms; $R^{103}$ represents a hydrogen atom, an alkyl group having 1 to 10 carbon atoms, or an acyl group having 2 to 10 carbon atoms; l represents an integer of 1 to 6; and k represents a number such that the average value of k×l is 6 to 80.)

In the above general formula (9), the alkyl groups in $R^{101}$ and $R^{103}$ may be either linear, branched, or cyclic. Specific examples of such alkyl groups may include a methyl group, an ethyl group, a n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the number of carbon atoms in these alkyl groups exceeds 10, the miscibility with the refrigerant is reduced and phase separation may occur. The preferred number of carbon atoms in the alkyl groups is 1 to 6.

Also, the alkyl group moieties of the acyl groups in $R^{101}$ and $R^{103}$ may be either linear, branched, or cyclic. Specific examples of the alkyl group moieties of the acyl groups may include the same various groups having 1 to 9 carbon atoms listed above as the specific examples of alkyl groups. When the number of carbon atoms in these acyl groups exceeds 10, the miscibility with the refrigerant is reduced and phase separation may occur. The preferred number of carbon atoms in the acyl groups is 2 to 6.

When $R^{101}$ and $R^{103}$ are both alkyl groups or acyl groups, $R^{101}$ and $R^{103}$ may be the same as or different from each other.

Furthermore, when l is 2 or more, multiple $R^{103}$ in one molecule may be the same or different.

When $R^{101}$ is an aliphatic hydrocarbon group having 1 to 10 carbon atoms with 2 to 6 bonding sites, this aliphatic hydrocarbon group may be chain-like or cyclic. Examples of the aliphatic hydrocarbon group with 2 bonding sites include an ethylene group, a propylene group, a butylene group, a pentylene group, a hexylene group, a heptylene group, an octylene group, a nonylene group, a decylene group, a cyclopentylene group, and a cyclohexylene group. Also, examples of the aliphatic hydrocarbon group with 3 to 6 bonding sites may include residues obtained by removing hydroxyl groups from polyhydric alcohols such as trimethylolpropane, glycerin, pentaerythritol, sorbitol; 1,2,3-trihydroxycyclohexane; and 1,3,5-trihydroxycyclohexane.

When the number of carbon atoms in this aliphatic hydrocarbon group exceeds 10, the miscibility with the refrigerant is reduced and phase separation may occur. The preferred number of carbon atoms is 2 to 6.

$R^{102}$ in the above general formula (9) is an alkylene group having 2 to 4 carbon atoms, and examples of the repeating unit, oxyalkylene group, include an oxyethylene group, an oxypropylene group, and an oxybutylene group. The oxyalkylene groups in one molecule may be the same, or two or more kinds of oxyalkylene groups may be contained, but those containing at least oxypropylene units in one molecule are preferable, and in particular, those containing 50% by mole or more of oxypropylene units in the oxyalkylene units are suitable.

In the above general formula (9), l is an integer of 1 to 6, which can be determined depending on the number of bonding sites of $R^{101}$. For example, when $R^{101}$ is an alkyl group or an acyl group, l is 1, and when $R^{101}$ is an aliphatic hydrocarbon group with 2, 3, 4, 5, and 6 bonding sites, l is 2, 3, 4, 5, and 6, respectively. It is preferable that l is 1 or 2. Also, k is preferably a number such that the average value of k×l is 6 to 80.

As for the structure of the polyoxyalkylene oil, polyoxypropylene diol dimethyl ether represented by the following general formula (10) and poly(oxyethylene/oxypropylene) diol dimethyl ether represented by the following general formula (11) are suitable in terms of economic efficiency and the aforementioned effects, and polyoxypropylene diol monobutyl ether represented by the following general formula (12), and furthermore, polyoxypropylene diol monomethyl ether represented by the following general formula (13), poly(oxyethylene/oxypropylene) diol monomethyl ether represented by the following general formula (14), poly(oxyethylene/oxypropylene) diol monobutyl ether represented by the following general formula (15), and polyoxypropylene diol diacetate represented by the following general formula (16) are also suitable in terms of economic efficiency and the like.

$$CH_3O—(C_3H_6O)_h—CH_3 \quad (10)$$

(In the formula, h represents a number of 6 to 80.)

$$CH_3O—(C_2H_4O)_i—(C_3H_6O)_j—CH_3 \quad (11)$$

(In the formula, i and j each represent a number that is 1 or more and the total of i and j is 6 to 80.)

$$C_4H_9O—(C_3H_6O)_h—H \quad (12)$$

(In the formula, h represents a number of 6 to 80.)

$$CH_3O—(C_3H_6O)_h—H \quad (13)$$

(In the formula, h represents a number of 6 to 80.)

$$CH_3O—(C_2H_4O)_i—(C_3H_6O)_j—H \quad (14)$$

(In the formula, i and j each represent a number that is 1 or more and the total of i and j is 6 to 80.)

$$C_4H_9O—(C_2H_4O)_i—(C_3H_6O)_j—H \quad (15)$$

(In the formula, i and j each represent a number that is 1 or more and the total of i and j is 6 to 80.)

$$CH_3COO—(C_3H_6O)_h—COCH_3 \quad (16)$$

(In the formula, h represents a number of 6 to 80.)

As this polyoxyalkylene oil, one kind of polyoxyalkylene oil may be used alone, or two or more kinds of polyoxyalkylene oils may be used in combination.

(2-2) Hydrocarbon Refrigerator Oil

As the hydrocarbon refrigerator oil, for example, an alkylbenzene can be used.

As the alkylbenzene, branched alkylbenzenes synthesized from a propylene polymerized product and benzene as raw materials using a catalyst such as hydrogen fluoride, and linear alkylbenzenes synthesized from normal paraffin and benzene as raw materials using the same catalyst can be used. The number of carbon atoms in the alkyl group is preferably 1 to 30 and more preferably 4 to 20, from the viewpoint of achieving a suitable viscosity as the lubricating oil base oil. Also, the number of alkyl groups that one molecule of alkylbenzene has depends on the number of carbon atoms of the alkyl group, but it is preferably 1 to 4 and more preferably 1 to 3 in order to keep the viscosity within the set range.

Note that the hydrocarbon refrigerator oil is preferably circulated together with the refrigerant in the refrigeration cycle system. Although the most preferable form of the refrigerator oil is that it is dissolved in the refrigerant, as long as the refrigerator oil can be circulated together with the refrigerant in the refrigeration cycle system, even a refrigerator oil with low solubility (for example, the refrigerator oil described in Japanese Patent No. 2,803,451) can be used, for example. In order to circulate the refrigerator oil in the refrigeration cycle system, the kinematic viscosity of the refrigerator oil is required to be small. As for the kinematic viscosity of the hydrocarbon refrigerator oil, it is preferably 1 $mm^2/s$ or more and 50 $mm^2/s$ or less at 40° C., and more preferably 1 $mm^2/s$ or more and 25 $mm^2/s$ or less.

These refrigerator oils may be used alone as one kind, or two or more kinds may be used in combination.

The content of the hydrocarbon refrigerator oil in the working fluid for a refrigerator may be, for example, 10 parts by mass or more and 100 parts by mass or less, and it is more preferably 20 parts by mass or more and 50 parts by mass or less, relative to 100 parts by mass of the refrigerant composition.

(2-3) Resin Particles

In the present disclosure, the refrigerator oil contains resin particles with a specific particle size distribution. The resin particles refer to an aggregate of particulate objects formed of the resin. Note that, for convenience, in the present disclosure, the term "resin particles" means that they are in a state of dispersion in the refrigerator oil, and the term "resin powder", which will be mentioned later, means that it is an aggregate of particulate objects formed of the resin, but in a dried state. Having the "specific particle size distribution" means that the particle size of the resin particles has a relatively broad and wide particle size distribution.

As will be mentioned later, the refrigeration cycle apparatus has a refrigerant circuit, and depending on the location of the refrigerant circuit, the refrigerant composition, the refrigerator oil, or the working fluid for a refrigerator exists. When a minute through hole occurs in such a refrigerant circuit, there is a possibility that the refrigerant may leak out to the outside through that hole.

In the present disclosure, the resin particles act in such a way that a portion of them enter the hole causing the refrigerant leakage and block the hole at least partially, preferably substantially entirely. The hole diameter of the hole to be blocked is not necessarily uniform, and may vary widely depending on factors such as individual differences in the refrigeration cycle apparatus and the environment in which it is arranged. Also, depending on the environment in which the refrigerant circuit exists, the generated hole may grow to have a larger diameter. In order to cope with such a variety of the hole diameters, it is preferable that the resin particles in the present disclosure have a relatively wide distribution width and a broad distribution as the specific particle size distribution. As a result, it is possible to reduce the refrigerant leakage ratio.

In the present disclosure, as such a specific particle size distribution, specifically the $D_{50}$ and the $D_{90}/D_{10}$ can be used as indicators. Here, $D_{10}$, $D_{50}$, and $D_{90}$ mean the particle sizes when the cumulative volume proportion in the particle size distribution based on volume is 10%, 50%, and 90%, respectively. These particle sizes are calculated from the particle size distribution measured by a centrifugal sedimentation type particle size distribution measurement apparatus (CAPA-700, Horiba) while the resin particles are dispersed in the refrigerator oil, as will be described in Examples below.

In the present disclosure, the specific particle size distribution refers to a $D_{50}$ of 2.0 μm to 10.0 μm and a $D_{90}/D_{10}$ of 4.0 to 14.0. The $D_{50}$ is of a concept similar to the average particle diameter of the resin particles, and when the $D_{50}$ of the particles is smaller than the above range, there tends to be more particles that are too small and pass through the hole, and thus they cannot contribute to the blockage of the hole. When the $D_{50}$ of the particles is larger than the above range, there tends to be more particles that are too large and cannot enter the hole, and thus they cannot contribute to the blockage of the hole.

The lower limit of $D_{50}$ is preferably 2.5 μm, more preferably 3.0 μm, particularly preferably 3.5 μm, still more preferably 4.0 μm, and most preferably 4.5 μm, and is, for example, 5.0 μm. The upper limit of $D_{50}$ is preferably 9.5 μm, more preferably 9.0 μm, particularly preferably 8.5 μm, and still more preferably 8.0 μm.

Although it depends on the environment in which the refrigeration cycle apparatus is located, it can be expected that the proportion of the particles that can contribute to the blockage of the hole would tend to be increased when, for example, the resin particles have an upper limit and/or lower limit as mentioned above, but this does not bind the present disclosure.

In addition, the lower limit of $D_{90}/D_{10}$ is preferably 4.5, and more preferably 5.0. The upper limit of $D_{90}/D_{10}$ is preferably 13.5, and more preferably 13.0. Such a value of $D_{90}/D_{10}$ means that the distribution width of the particle size is large. As in the case of $D_{50}$, for the upper limit and the lower limit thereof, when the value of $D_{90}/D_{10}$ is excessively small, there tends to be more small particles that pass through the hole and cannot contribute to the blockage, and when it is excessively large, there tends to be more large particles that cannot enter the hole and thus cannot contribute to the blockage of the hole.

In the present disclosure, in a preferable embodiment, the specific particle size distribution includes a standard deviation of 3.0 μm to 8.0 μm. The standard deviation is calculated from the particle size distribution measured by the centrifugal sedimentation type particle size distribution measurement apparatus, as mentioned above. The lower limit of this standard deviation is more preferably 3.5 μm, and particularly preferably 4.0 μm. The upper limit of this standard deviation is more preferably 7.5 μm. Such a standard deviation value means that the distribution width of the particle size is large, and the same mentioned above applies to the upper limit and the lower limit as for $D_{90}/D_{10}$.

In the present disclosure, the resin constituting the resin particles may be any suitable one, and it is preferably one having flexibility since it can easily conform to and enter the shape of the hole causing the refrigerant leakage. Specifically, the resin may be a silicone resin, a fluorine-containing resin, or the like, and it is preferably a fluorine-containing resin, more preferably a polytetrafluoroethylene (PTFE) resin, a tetrafluoroethylene/hexafluoropropylene copolymer (FEP) resin, a tetrafluoroethylene/perfluoroalkyl vinyl ether copolymer (PFA) resin, or the like, for example, particularly preferably a polytetrafluoroethylene (PTFE) resin, and still further preferably a low molecular weight PTFE resin. When the resin particles are constituted by a silicone resin, a fluorine-containing resin, or the like, they are easily dispersed uniformly in the refrigerator oil because of their high specific gravity. In addition, they have high heat resistance, durability, and lubricity, and are stable against the refrigerant and the refrigerator oil, thus being suitable.

It is preferable that the low molecular weight PTFE resin has a melt viscosity at 380° C. of $1\times10^2$ to $7\times10^5$ Pa·s. Among such a low molecular weight PTFE resin, one having 8 or more and 14 or less carbon atoms that is substantially free from a perfluorocarboxylic acid and/or a salt thereof is preferable, and one having 8 carbon atoms that is substantially free from a perfluorocarboxylic acid (PFOA) and/or a salt thereof is still more preferable. Note that, in the present disclosure, the phrase "substantially free from" means, on a mass basis, preferably 50 ppb or less, more preferably less than 25 ppb, still more preferably 15 ppb or less, and particularly preferably less than 5 ppb or less. The lower limit is not limited and may be an amount less than the detection limit. The amount of the above perfluorocarboxylic acid and/or a salt thereof can be measured by liquid chromatography.

As for the method for producing the low molecular weight PTFE resin, there are several methods such as polymerization, radiation decomposition, and thermal decomposition. In the present disclosure, a low molecular weight PTFE resin obtained by the polymerization method is preferable. In the present disclosure, in the case of a low molecular weight PTFE resin obtained by the radiation decomposition method, one having 8 or more and 14 or less carbon atoms that is substantially free from a perfluorocarboxylic acid and/or a salt thereof is also preferable.

Note that the low molecular weight PTFE resin obtained by the radiation decomposition method is preferably any of the low molecular weight PTFE resins obtained by the methods described in, for example, International Publication Nos. WO 2018/026012, WO 2018/026017, WO 2019/156036, WO 2020/156037, WO 2019/156038, WO 2019/156039, WO 2019/156053, WO 2019/156065, WO 2019/156067, and WO 2019/156071.

Such resin particles may be contained in the refrigerator oil in any appropriate content. For example, the content of the resin particles is, as the lower limit, preferably 0.0001 parts by mass, more preferably 0.001 parts by mass, still more preferably 0.01 parts by mass, and particularly preferably 0.1 parts by mass, relative to 100 parts by mass of the refrigerator oil. The content of the resin particles is, as the upper limit, preferably 20 parts by mass, more preferably 10 parts by mass, still more preferably 5 parts by mass, and particularly preferably 3 parts by mass. When the content is less than 0.0001 parts by mass, the effect of acting to substantially entirely block the hole causing refrigerant leakage becomes small. When the content exceeds 20 parts by mass, the viscosity of the refrigerator oil is increased and the flowability of the refrigerator oil is reduced.

The refrigerator oil which contains the resin particles having the specific particle size distribution in the present disclosure can be obtained by, for example, obtaining resin powder with a wide particle size distribution, pulverizing it if required, and mixing that resin powder so as to be dispersed in the refrigerator oil. The pulverization method and the dispersion/mixing method may be any appropriate known method, and for example, a homogenizer, a roll mill, a sand mill, or the like may be used.

(2-4) Additive Agent

The refrigerator oil may contain one kind of additive agent or two or more kinds of additive agents.

Examples of the additive agent include acid scavengers, extreme pressure agents, antioxidants, antifoaming agents, oiliness improvers, metal deactivators such as copper deactivators, anti-wear agents, and compatibilizing agents.

As the acid scavenger, phenyl glycidyl ether, alkyl glycidyl ethers, alkylene glycol glycidyl ethers, cyclohexene oxide, α-olefin oxides, epoxy compounds such as epoxidized soybean oil, carbodiimides, and the like can be used. Note that, among these, phenyl glycidyl ether, alkyl glycidyl ethers, alkylene glycol glycidyl ethers, cyclohexene oxide, and α-olefin oxides are preferable from the viewpoint of miscibility. The alkyl groups of alkyl glycidyl ethers and the alkylene groups of alkylene glycol glycidyl ethers may be branched. The number of carbon atoms in them may be 3 or more and 30 or less, more preferably 4 or more and 24 or less, and still more preferably 6 or more and 16 or less. Also, as for the α-olefin oxide, the total number of carbon atoms may be 4 or more and 50 or less, more preferably 4 or more and 24 or less, and still more preferably 6 or more and 16 or less. Only one kind of acid scavenger may be used, or multiple kinds can be used in combination.

As the extreme pressure agent, those containing phosphate esters can be used, for example.

As the phosphate ester, phosphate esters, phosphite esters, acidic phosphate esters, acidic phosphite esters, and the like can be used, and those containing amine salts of phosphate esters, phosphite esters, acidic phosphate esters, and acidic phosphite esters can also be used.

As for the phosphate ester, there are triaryl phosphates, trialkyl phosphates, trialkylaryl phosphates, triarylalkyl phosphates, trialkenyl phosphates, and the like. Furthermore, when specifically listing the phosphate ester, there are triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, trioleyl phosphate, and the like.

Also, as for specific examples of the phosphite ester, there are triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite, trioleyl phosphite, and the like.

In addition, as for specific examples of the acidic phosphate ester, there are 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearyl acid phosphate, isostearyl acid phosphate, and the like.

Moreover, as for specific examples of the acidic phosphite ester, there are dibutyl hydrogen phosphite, dilauryl hydrogen phosphite, dioleyl hydrogen phosphite, distearyl hydrogen phosphite, diphenyl hydrogen phosphite, and the like. Among the phosphate esters listed above, oleyl acid phosphate and stearyl acid phosphate are suitable.

Also, among amines used in the amine salts of phosphate esters, phosphite esters, acidic phosphate esters, or acidic phosphite esters, specific examples of monosubstituted amines include butylamine, pentylamine, hexylamine, cyclohexylamine, octylamine, laurylamine, stearylamine, oleylamine, and benzylamine. In addition, specific examples of disubstituted amines include dibutylamine, dipentylamine, dihexylamine, dicyclohexylamine, dioctylamine, dilaurylamine, distearylamine, dioleylamine, dibenzylamine, stearyl monoethanolamine, decyl monoethanolamine, hexyl monopropanolamine, benzyl monoethanolamine, phenyl monoethanolamine, and tolyl monopropanol. Moreover, specific examples of trisubstituted amines include tributylamine, tripentylamine, trihexylamine, tricyclohexylamine, trioctylamine, trilaurylamine, tristearylamine, trioleylamine, tribenzylamine, dioleyl monoethanolamine, dilauryl monopropanolamine, dioctyl monoethanolamine, dihexyl monopropanolamine, dibutyl monopropanolamine, oleyl diethanolamine, stearyl dipropanolamine, lauryl diethanolamine, octyl dipropanolamine, butyl diethanolamine, benzyl diethanolamine, phenyl diethanolamine, tolyl dipropanolamine, xylyl diethanolamine, triethanolamine, and tripropanolamine.

Also, examples of extreme pressure agents other than those described above include organic sulfur compound-based extreme pressure agents such as monosulfides, polysulfides, sulfoxides, sulfones, thiosulfinates, sulfurized oils and fats, thiocarbonates, thiophenes, thiazoles, and methanesulfonate esters; thiophosphate ester-based extreme pressure agents such as thiophosphate triesters; ester-based extreme pressure agents such as higher fatty acids, hydroxyaryl fatty acids, polyhydric alcohol esters, and acrylate esters; organochlorine-based extreme pressure agents such as chlorinated hydrocarbons including chlorinated paraffins, and chlorinated carboxylic acid derivatives; organofluorinated extreme pressure agents such as fluorinated aliphatic carboxylic acids, fluorinated ethylene resins, fluorinated alkyl polysiloxanes, and fluorinated graphites; alcohol-based extreme pressure agents such as higher alcohols; and metal compound-based extreme pressure agents such as naphthenate salts (lead naphthenate and the like), fatty acid salts (lead fatty acid and the like), thiophosphate salts (zinc dialkyldithiophosphates and the like), thiocarbamate salts, organomolybdenum compounds, organotin compounds, organogermanium compounds, and borate esters.

As the antioxidant, phenolic antioxidants and amine-type antioxidants can be used, for example. As for the phenolic antioxidant, there are 2,6-di-tert-butyl-4-methylphenol (DBPC), 2,6-di-tert-butyl-4-ethylphenol, 2,2'-methylenebis (4-methyl-6-tert-butylphenol), 2,4-dimethyl-6-tert-butylphenol, 2,6-di-tert-butylphenol, di-tert-butyl-p-cresol, bisphenol A, and the like. Also, as for the amine-type antioxidant, there are N,N'-diisopropyl-p-phenylenediamine, N,N'-di-sec-butyl-p-phenylenediamine, phenyl-α-naphthylamine, N,N'-di-phenyl-p-phenylenediamine, N,N-di(2-naphthyl)-p-phenylenediamine, and the like. Note that oxygen scavengers, which capture oxygen, can also be used as the antioxidant.

As the antifoaming agent, silicon compounds can be used, for example.

As the oiliness improver, higher alcohols, fatty acids, and the like can be used, for example.

As the metal deactivator such as copper deactivator, benzotriazole and derivatives thereof, and the like can be used.

As the anti-wear agents, zinc dithiophosphate and the like can be used.

The compatibilizing agent is not limited and can be selected as appropriate from among generally used compatibilizing agents, and one kind of compatibilizing agent may be used alone, or two or more kinds of compatibilizing agents may be used. Examples of the compatibilizing agent include polyoxyalkylene glycol ethers, amides, nitriles, ketones, chlorocarbons, esters, lactones, aryl ethers, fluoroethers, and 1,1,1-trifluoroalkanes. As the compatibilizing agent, polyoxyalkylene glycol ethers are particularly preferable.

Note that, as required, a load carrying additive agent, a chlorine scavenger, a detergent dispersant, a viscosity index improver, a heat resistance improver, a stabilizer, a corrosion inhibitor, a heat resistance improver, a pour point depressant, an anti-rust agent, and the like can also be added to the refrigerator oil.

As for the amount of each additive agent to be compounded, the proportion contained in the refrigerator oil may be 0.01% by mass or more and 5% by mass or less, and it is preferably 0.05% by mass or more and 3% by mass or less. Note that the compounding ratio of additive agents in the working fluid for a refrigerator formed by combining the refrigerant composition and the refrigerator oil is preferably 5% by mass or less and more preferably 3% by mass or less.

Note that the refrigerator oil preferably has a chlorine concentration of 50 ppm or less and preferably has a sulfur concentration of 50 ppm or less.

(3) Refrigerant Circuit

The FIGURE shows an example of a refrigerant circuit 10 that an air conditioning apparatus 1, which is a refrigeration cycle apparatus.

The air conditioning apparatus 1 is a apparatus used for cooling and/or heating indoors by carrying out vapor compression type refrigeration cycle operation. The air conditioning apparatus 1 mainly comprises an outdoor unit 2, an indoor unit 3, and liquid-side refrigerant connection pipe 9 and gas-side refrigerant connection pipe 8 connecting the outdoor unit 2 and the indoor unit 3.

The refrigerant circuit 10 that the air conditioning apparatus 1 has includes a compressor 4, an outdoor heat exchanger 5, an expansion valve 6, and an indoor heat exchanger 7, and the above compression type refrigerant circuit is constituted by connecting them with the liquid-side refrigerant connection pipe 9, the gas-side refrigerant connection pipe 8, and other refrigerant pipe. Note that the air conditioning apparatus 1 has a microcomputer, memory, and other components and has a control section for driving and controlling various actuators.

Note that, in the refrigerant circuit 10, a working fluid for a refrigerator containing a refrigerant composition, which is a refrigerant as mentioned above, and a refrigerator oil is enclosed.

(3-1) Indoor Unit

The indoor unit 3 is installed on the ceiling surface or wall of a room, is connected to the outdoor unit 2 via the liquid-side refrigerant connection pipe 9 and the gas-side refrigerant connection pipe 8, and constitutes a part of the refrigerant circuit 10. Note that, in the refrigerant circuit 10, multiple indoor units 3 may be connected in parallel to each other.

The indoor unit 3 has the indoor heat exchanger 7 and an indoor fan 13.

The indoor heat exchanger 7 is not limited, and for example, it is configured with heat transfer pipes and a large number of fins. The indoor heat exchanger 7 functions as an evaporator for the refrigerant during cooling operation to carry out cooling of the indoor air, and functions as a condenser for the refrigerant during heating operation to heat the indoor air.

The indoor fan 13 inhales the indoor air into the indoor unit 3, and generates an air flow by which the indoor air undergoes heat exchange with the refrigerant in the indoor heat exchanger 7 and is then supplied to indoors as supply air. The indoor fan 13 has a motor for the indoor fan.

(3-2) Outdoor Unit

The outdoor unit 2 is installed outdoors and connected to the indoor unit 3 via the liquid-side refrigerant connection pipe 9 and the gas-side refrigerant connection pipe 8.

The outdoor unit 2 has the compressor 4, the outdoor heat exchanger 5, an outdoor fan 12, the expansion valve 6, an accumulator 11, a four-way switching valve 10, a liquid-side shut-off valve 14, a gas-side shut-off valve 15, and the like.

The compressor 4 is a positive displacement compressor or the like, driven by a motor for the compressor. The motor for the compressor may be, for example, one driven by a supply of electric power through an inverter apparatus (not shown in the FIGURE).

The outdoor heat exchanger 5 is not limited, and for example, it is configured with heat transfer pipes and a large number of fins. The outdoor heat exchanger 5 functions as a condenser for the refrigerant during cooling operation, and functions as an evaporator for the refrigerant during heating operation.

The outdoor fan 12 inhales the outdoor air into the outdoor unit 2, and generates an air flow by which the outdoor air undergoes heat exchange with the refrigerant in the outdoor heat exchanger 5 and is then discharged outdoors. This outdoor fan 12 has a motor for the outdoor fan.

The expansion valve 6 is capable of regulating the pressure of the refrigerant passing through it by regulating the valve opening degree.

The accumulator 11 is provided on the inlet side of the compressor 4 between the four-way switching valve 10 and the compressor 4, and separates the refrigerant in the liquid state from the refrigerant in the gaseous state.

The four-way switching valve 10 can switch the state of connection between a cooling operation connection state in which the downstream side of the accumulator 11 and the gas-side shut-off valve 15 are connected while connecting the discharge side of the compressor 4 and the outdoor heat exchanger 5, and a heating operation connection state in which the downstream side of the accumulator 11 and the outdoor heat exchanger 5 are connected while connecting the discharge side of the compressor 4 and the gas-side shut-off valve 15.

The liquid-side shut-off valve 14 and the gas-side shut-off valve 15 are valves provided at the connection openings with external equipment and pipe (specifically, the liquid-side refrigerant connection pipe 5 and the gas-side refrigerant connection pipe 6).

(3-3) Refrigeration Cycle

In the air conditioning apparatus 1, during cooling operation, the four-way switching valve 10 is in the cooling operation connection state, and the high-temperature, high-pressure refrigerant that has been discharged from the compressor 4 is condensed in the outdoor heat exchanger 5, which functions as a condenser for the refrigerant, decompressed as it passes through the expansion valve 6, and supplied to the gas side of the indoor unit 3 via the liquid-side refrigerant connection pipe 9. The refrigerant that has been supplied to the indoor unit 3 is evaporated in the indoor heat exchanger 7, which functions as an evaporator for the refrigerant, passes through the gas-side refrigerant connection pipe 8, and is then inhaled into the compressor 4 via the accumulator 11 of the outdoor unit 2.

In the air conditioning apparatus 1, during heating operation, the four-way switching valve 10 is in the heating operation connection state, and the high-temperature, high-pressure refrigerant that has been discharged from the compressor 4 is sent to the gas side of the indoor unit 3 via the gas-side refrigerant connection pipe 8. The refrigerant that has been sent to the indoor unit 3 is condensed in the indoor heat exchanger 7, which functions as a condenser for the refrigerant, and sent to the expansion valve 6 of the outdoor unit 2 via the liquid-side refrigerant connection pipe 9. The refrigerant that has been decompressed as it passes through the expansion valve 6 is evaporated in the outdoor heat exchanger 5, which functions as an evaporator for the refrigerant, and is inhaled into the compressor 4 via the accumulator 11.

Note that the refrigeration cycle apparatus is not limited and examples thereof include cooling apparatuses for room air conditioners, packaged air conditioners, refrigerators, automotive air conditioners, hot water supply units, dehumidifiers, freezers, freezing and refrigeration warehouses, vending machines, showcases, and chemical plants, but above all, it is particularly preferably used in a refrigerator with a sealed compressor. Also, each refrigerator oil of the present embodiment can be used in any type of compressor, such as a reciprocating, rotary, or centrifugal type. Note that, in these refrigerators, the refrigerator oil of the present embodiment is used as a working fluid for a refrigerator that has been mixed with a refrigerant composition.

(4) Refrigerant and Refrigerant Composition (4-1) Definition of Terms

The term "refrigerant" as used herein includes at least a compound with a refrigerant number beginning with the letter R (ASHRAE number), which indicate a types of the refrigerants, as defined by ISO 817 (International Organization for Standardization), and also includes those having refrigerant characteristics that are equivalent to those of the above compounds, even if they have not yet been assigned refrigerant numbers. Refrigerants are broadly classified into "fluorocarbon compounds" and "non-fluorocarbon compounds" in terms of the structures of compounds. The "fluorocarbon compounds" include chlorofluorocarbons (CFCs), hydrochlorofluorocarbons (HCFCs), and hydrofluorocarbons (HFCs). Examples of the "non-fluorocarbon compounds" include propane (R290), propylene (R1270), butane (R600), isobutane (R600a), carbon dioxide (R744), and ammonia (R717). Note that the "refrigerant" includes mixtures of multiple kinds of refrigerants.

As used herein, the term "refrigerant composition" refers to one that is the refrigerant itself (including a mixture of refrigerants) and another one that additionally contains other component, which another one is distinguished from the refrigerant itself (including a mixture of refrigerants). This "refrigerant composition" includes compositions that can be used to obtain a working fluid for a refrigerator by mixing with at least a refrigerator oil.

As used herein, the term "working fluid for a refrigerator" includes compositions that contain a refrigerant composition and a refrigerator oil, and may sometimes be referred to as a "refrigerator oil-containing working fluid" so as to distinguish from the "refrigerant composition".

Note that, as the term including at least the three forms: "refrigerant", "refrigerant composition", and "working fluid for a refrigerator (refrigerator oil-containing working fluid)", "refrigerant-containing composition" can be used.

The term "alternative" as used herein means that, as a first pattern, when used in the context of substituting a first refrigerant with a second refrigerant, an equipment designed to be operated using the first refrigerant can be operated using the second refrigerant under optimal conditions with only minor component changes (at least one of the following: refrigerator oils, gaskets, packings, expansion valves, dryers, and other components) and equipment adjustments as required. That is, this pattern refers to the operation of the same equipment with an "alternative" refrigerant. Aspects of this pattern of "alternative" may include "drop-in alternatives", "nearly drop-in alternatives", and "retrofits", in the order where the extent of changes and adjustments required to replace the first refrigerant with the second refrigerant is smaller.

As a second pattern, the term "alternative" also includes the use of equipment designed to operate using a second refrigerant, with the second refrigerant mounted, for the same application as the existing application of a first refrigerant. This pattern refers to the provision of the same application, but with an "alternative" refrigerant.

The term "refrigerator" as used herein refers to any apparatus that removes heat from an object or space to make its temperature lower than the surrounding outside air and maintains this lower temperature. In other words, the refrigerator refers to a conversion apparatus that obtains energy from the outside to do work and perform energy conversion in order to move heat from a lower temperature to a higher one.

When a refrigerant is "WCF slightly flammable" as used herein, it means that the most flammable formulation (worst case of formulation for flammability; WCF) has a burning velocity of 10 cm/s or less according to the U.S. ANSI/ASHRAE Standard 34-2013. Also, when a refrigerant is "ASHRAE slightly flammable" as used herein, it means that the burning velocity of WCF is 10 cm/s or less and that the most flammable fractional formulation (worst case of fractionation for flammability; WCFF), which is identified by carrying out a leak test during storage, transport, and use according to the ANSI/ASHRAE 34-2013 using the WCF, has a burning velocity of 10 cm/s or less, which means that the flammability classification is determined as "Class 2L" according to the U.S. ANSI/ASHRAE Standard 34-2013.

As used herein, when a refrigerant is referred to as having a "RCL of x % or more", it means that the refrigerant concentration limit (RCL) for such a refrigerant, calculated in accordance with the U.S. ANSI/ASHRAE Standard 34-2013, is x % or more. The RCL is a concentration limit in the air that takes into account the safety factor, and is an index intended to reduce the risk of acute toxicity, asphyxiation, and flammability in enclosed spaces where humans are present. The RCL is determined in accordance with the above standard. Specifically, the RCL is the lowest concentration among the acute toxicity exposure limit (ATEL), the oxygen deprivation limit (ODL), and the flammable concentration limit (FCL) calculated in accordance with 7.1.1, 7.1.2, and 7.1.3 of the above standard, respectively.

The temperature glide as used herein means the absolute value of the difference between the starting temperature and the ending temperature of the phase change process of the refrigerant composition of the present disclosure in a heat exchanger of a refrigerant system.

(4-2) Application of Refrigerant

The refrigerant of the present disclosure can be preferably used as a working fluid in a refrigerator.

The composition of the present disclosure is suited for use as an alternative refrigerant to HFC refrigerants such as R410A, R407C, and R404A, and HCFC refrigerants such as R22.

(4-3) Refrigerant Composition

The refrigerant composition of the present disclosure at least contains the refrigerant of the present disclosure and can be used for the same application as that of the refrigerant of the present disclosure. Also, the refrigerant composition of the present disclosure can be used to obtain a working fluid for a refrigerator by further mixing with at least a refrigerator oil.

The refrigerant composition of the present disclosure further contains at least one kind of other component in addition to the refrigerant of the present disclosure. The refrigerant composition of the present disclosure may contain, as required, at least one of the following other components. As mentioned above, when the refrigerant composition of the present disclosure is used as a working fluid in a refrigerator, it is normally mixed with at least a refrigerator oil for use. Accordingly, the refrigerant composition of the present disclosure is preferably substantially free of refrigerator oil. Specifically, in the refrigerant composition of the present disclosure, the content of the refrigerator oil relative to the entire refrigerant composition is preferably 0 to 1% by mass, and more preferably 0 to 0.1% by mass.

(4-3-1) Water

The refrigerant composition of the present disclosure may contain a minute amount of water. It is preferable to set the water content ratio in the refrigerant composition to 0.1% by mass or less, relative to the entire refrigerant.

(4-3-2) Tracer

A tracer is added to the refrigerant composition of the present disclosure at a detectable concentration such that, when the refrigerant composition of the present disclosure is diluted, contaminated, or otherwise changed in any way, that change can be tracked.

The refrigerant composition of the present disclosure may contain one kind of tracer alone or two or more kinds of tracers, as the tracer.

The tracer is not limited and can be selected as appropriate from among generally used tracers. Preferably, a compound that cannot be an impurity that is inevitably mixed into the refrigerant of the present disclosure is selected as the tracer.

Examples of the tracer include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$).

As the tracer, hydrofluorocarbons, hydrochlorofluorocarbons, chlorofluorocarbons, hydrochlorocarbons, fluorocarbons, and fluoroethers are particularly preferable.

As the above tracer, specifically, the following compounds are preferable:

FC-14 (tetrafluoromethane, $CF_4$);
HCC-40 (chloromethane, $CH_3Cl$);
HFC-23 (trifluoromethane, $CHF_3$);
HFC-41 (fluoromethane, $CH_3Cl$);
HFC-125 (pentafluoroethane, $CF_3CHF_2$);
HFC-134a (1,1,1,2-tetrafluoroethane, $CF_3CH_2F$);
HFC-134 (1,1,2,2-tetrafluoroethane, $CHF_2CHF_2$);
HFC-143a (1,1,1-trifluoroethane, $CF_3CH_3$);
HFC-143 (1,1,2-trifluoroethane, $CHF_2CH_2F$);
HFC-152a (1,1-difluoroethane, $CHF_2CH_3$);
HFC-152 (1,2-difluoroethane, $CH_2FCH_2F$);
HFC-161 (fluoroethane, $CH_3CH_2F$);
HFC-245fa (1,1,1,3,3-pentafluoropropane, $CF_3CH_2CHF_2$);
HFC-236fa (1,1,1,3,3,3-hexafluoropropane, $CF_3CH_2CF_3$);
HFC-236ea (1,1,1,2,3,3-hexafluoropropane, $CF_3CHFCHF_2$);
HFC-227ea (1,1,1,2,3,3,3-heptafluoropropane, $CF_3CHFCF_3$);
HCFC-22 (chlorodifluoromethane, $CHClF_2$);
HCFC-31 (chlorofluoromethane, $CH_2ClF$);
CFC-1113 (chlorotrifluoroethylene, $CF_2{=}CClF$);
HFE-125 (trifluoromethyl difluoromethyl ether, $CF_3OCHF_2$);
HFE-134a (trifluoromethyl fluoromethyl ether, $CF_3OCH_2F$);
HFE-143a (trifluoromethyl methyl ether, $CF_3OCH_3$);
HFE-227ea (trifluoromethyl tetrafluoroethyl ether, $CF_3OCHFCF_3$); and
HFE-236fa (trifluoromethyl trifluoroethyl ether, $CF_3OCH_2CF_3$).

The tracer compound can be present in the refrigerant composition at a total concentration of about 10 weight parts per million (ppm) to about 1,000 ppm. Preferably, the tracer compound is present in the refrigerant composition at a total concentration of about 30 ppm to about 500 ppm, and most preferably, the tracer compound is present in the refrigerant composition at a total concentration of about 50 ppm to about 300 ppm.

(4-3-3) Ultraviolet Fluorescent Dye

The refrigerant composition of the present disclosure may contain one kind of ultraviolet fluorescent dye alone or two or more kinds of ultraviolet fluorescent dyes, as the ultraviolet fluorescent dye.

The ultraviolet fluorescent dye is not limited and can be selected as appropriate from among generally used ultraviolet fluorescent dyes.

Examples of the ultraviolet fluorescent dye include naphthalimide, coumarin, anthracene, phenanthrene, xanthene, thioxanthene, naphthoxanthene, fluorescein, and derivatives thereof. As the ultraviolet fluorescent dye, either or both naphthalimide and coumarin are particularly preferable.

(4-3-4) Stabilizer

The refrigerant composition of the present disclosure may contain one kind of stabilizer alone or two or more kinds of stabilizers, as the stabilizer.

The stabilizer is not limited and can be selected as appropriate from among generally used stabilizers.

Examples of the stabilizer include nitro compounds, ethers, and amines.

Examples of the nitro compounds include aliphatic nitro compounds such as nitromethane and nitroethane, and aromatic nitro compounds such as nitrobenzene and nitrostyrene.

Examples of the ethers include 1,4-dioxane.

Examples of the amines include 2,2,3,3,3-pentafluoropropylamine and diphenylamine.

Other examples of the stabilizer include butylhydroxyxylene and benzotriazole.

The content ratio of the stabilizer is not limited, and usually, it is preferable to set it to 0.01 to 5% by mass and more preferable to set it to 0.05 to 2% by mass, relative to the entire refrigerant.

(4-3-5) Polymerization Inhibitor

The refrigerant composition of the present disclosure may contain one kind of polymerization inhibitor alone or two or more kinds of polymerization inhibitors, as the polymerization inhibitor.

The polymerization inhibitor is not limited and can be selected as appropriate from among generally used polymerization inhibitors.

Examples of the polymerization inhibitor include 4-methoxy-1-naphthol, hydroquinone, hydroquinone methyl ether, dimethyl-t-butylphenol, 2,6-di-tert-butyl-p-cresol, and benzotriazole.

The content ratio of the polymerization inhibitor is not limited, and usually, it is preferable to set it to 0.01 to 5% by mass and more preferable to set it to 0.05 to 2% by mass, relative to the entire refrigerant.

(4-4) Refrigerator Oil-Containing Working Fluid

The refrigerator oil-containing working fluid of the present disclosure at least contains the refrigerant or refrigerant composition of the present disclosure and a refrigerator oil, and is used as a working fluid in a refrigerator. Specifically, the refrigerator oil-containing working fluid of the present disclosure is obtained by mixing a refrigerator oil used in a compressor of a refrigerator and a refrigerant or refrigerant composition with each other. The refrigerator oil-containing working fluid generally contains a refrigerator oil in an amount of 10 to 50% by mass.

As the refrigerator oil contained in the refrigerator oil-containing working fluid, the refrigerator oils described in Item (2) Refrigerator Oil may be contained alone as one kind, or may be contained in two or more kinds. Note that the refrigerator oil may contain the additive agents described in Item (2-3) Additive Agent.

Examples of the refrigerant that can be used in the present disclosure include HFC refrigerants such as R410A, R407C, R404A, and R32. Also, HFO refrigerants such as R1123, R1234yf, and R1234ze may be used, and for example, Refrigerants 1 to 75 shown in Table 1 and Table 2 below can be used.

TABLE 1

| | designation | compositional features | (weight ratio, %) |
|---|---|---|---|
| refrigerant 1 | | R32/R125/R1234yf | (15/25/60) |
| refrigerant 2 | R513B | R1234yf/R134a | (58.5/41.5) |
| refrigerant 3 | R1234yf | R1234yf | (100) |
| refrigerant 4 | R463A | R744/R32/R125/R1234yf/R1134a | (6.0/36.0/30.0/14.0/14.0) |
| refrigerant 5 | R452B | R32/R125/R1234yf | (67/7/26) |
| refrigerant 6 | | R32/R1234yf | (72.5/27.5) |
| refrigerant 7 | R454B | R32/R1234yf | (68.9/31.1) |
| refrigerant 8 | R449A | R32/R125/R1234yf/R134a | (24.3/24.7/25.3/25.7) |
| refrigerant 9 | R452A | R32/R125/R1234yf | (11.0/59.0/30.0) |
| refrigerant 10 | R454A | R32/R1234yf | (35/65) |
| refrigerant 11 | R449C | R32/R125/R1234yf/R134a | (20/20/31/29) |
| refrigerant 12 | R454C | R32/R1234yf | (21.5/78.5) |
| refrigerant 13 | R513A | R1234yf/R134a | (56/44) |
| refrigerant 14 | R1336mzz(Z) | R1336mzz(Z) | (100) |
| refrigerant 15 | R1336mzz(E) | R1336mzz(E) | (100) |
| refrigerant 16 | R514A | R1336mzz(Z)/R1130(E) | (74.7/25.3) |
| refrigerant 17 | | R32/R125/R1234ze(E) | (68/15/17) |
| refrigerant 18 | R447B | R32/R125/R1234ze(E) | (68/8/24) |
| refrigerant 19 | R447A | R32/R125/R1234ze(E) | (68/3.5/28.5) |
| refrigerant 20 | | R32/R1234yf/R1234ze(E) | (73/15/12) |
| refrigerant 21 | | R32/R1234ze(E) | (72/27) |
| refrigerant 22 | R446A | R32/R1234ze(E)/Butane | (68/29/3) |
| refrigerant 23 | R448A | R32/R125/R1234yf/R134a/R1234ze(E) | (26/26/20/21/7) |
| refrigerant 24 | | R32/R125/R1234yf/R134a/R1234ze(E) | (25/25/9/21/20) |
| refrigerant 25 | | R32/R125/R1234yf/R134a | (25/25/30/20) |
| refrigerant 26 | | R32/R1234yf/R152a/R1234ze(E) | (40/20/10/30) |
| refrigerant 27 | R455A | R744/R32/R1234yf | (3.0/21.5/75.5) |
| refrigerant 28 | | R32/R125/R134a/R1234yf | (13/13/31/43) |
| refrigerant 29 | | R32/R125/R1234yf/R134a/R1234ze(E) | (12.5/12.5/13.5/31.5/30) |
| refrigerant 30 | | R32/R152a/R1234ze(E) | (45/20/35) |
| refrigerant 31 | R444B | R32/R152a/R1234ze(E) | (41.5/10/48.5) |
| refrigerant 32 | | R1234yf/R134a/R1234ze(E) | (18/42/40) |
| refrigerant 33 | R450A | R134a/R1234ze(E) | (42/58) |
| refrigerant 34 | R515A | R1234ze(E)/R227ea | (88/12) |
| refrigerant 35 | R515B | R1234ze(E)/R227ea | (91.1/8.9) |
| refrigerant 36 | R1234ze(E) | R1234ze(E) | (100) |
| refrigerant 37 | R1233zd(E) | R1233zd(E) | (100) |
| refrigerant 38 | | R32/R125/CF3I | (49.0/11.5/39.5) |
| refrigerant 39 | | R32/R1234yf/R134a | (50/40/10) |
| refrigerant 40 | R459A | R32/R1234yf/R1234ze(E) | (68/26/6) |
| refrigerant 41 | R452C | R32/R125/R1234yf | (12.5/61/26.5) |
| refrigerant 42 | R449B | R32/R125/R1234yf/R134a | (25.2/24.3/23.2/27.3) |
| refrigerant 43 | | R32/R1234yf/R134a | (28/51/21) |
| refrigerant 44 | | R32/RI234yf/R152a | (35/55/10) |
| refrigerant 45 | | R32/R1234yf | (29/71) |
| refrigerant 46 | R465A | R32/R290/R1234yf | (21.0/7.9/71.1) |
| refrigerant 47 | R457A | R32/R1234yf/R152a | (18/70/12) |
| refrigerant 48 | | R32/R125/R1234yf/R134a | (25/30/20/25) |
| refrigerant 49 | | R32/R125/R1234yf/R134a | |
| refrigerant 50 | | R32/R1234yf/R134a | (6/31/63) |

TABLE 2

| | designation | compositional features | (weight ratio, %) |
|---|---|---|---|
| refrigerant 51 | | R1234yf/R134a/R152a | (82/7/11) |
| refrigerant 52 | R516A | R1234yf/R134a/R152a | (77.5/8.5/14.0) |
| refrigerant 53 | | R1123/R32 | (32/68) |
| refrigerant 54 | | R1123/R32 | (40/60) |
| refrigerant 55 | | R1123/R32 | (45/55) |
| refrigerant 56 | | R1123/R32/R1234yf | (19/55/26) |
| refrigerant 57 | | R1123/R32/R1234yf | (40/44/16) |
| refrigerant 58 | | R1123 | (100) |
| refrigerant 59 | R1224yd(Z) | R1224yd(Z) | (100) |
| refrigerant 60 | | R744/R32/R1234ze(E) | (6/60/34) |
| refrigerant 61 | | R32/R134a/R1234ze | (76/6/18) |
| refrigerant 62 | R460A | R32/R125/R134a/ R1234ze(E) | (12/52/14/22) |
| refrigerant 63 | R459B | R32/R1234yf/R1234ze(E) | (21/69/10) |
| refrigerant 64 | R460B | R32/R125/R134a/ R1234ze(E) | (28/25/20/27) |
| refrigerant 65 | | R744/R32/R1234ze(E) | (7/30/63) |
| refrigerant 66 | 456A | R32/R134a/R1234ze(E) | (6/45/49) |
| refrigerant 67 | R445A | R744/R134a/R1234ze(E) | (6.0/9.0/85.0) |
| refrigerant 68 | R444A | R32/R152a/R1234ze(E) | (12/5/83) |

TABLE 2-continued

| | designation | compositional features | (weight ratio, %) |
|---|---|---|---|
| refrigerant 69 | R1132a | R1132a | (100) |
| refrigerant 70 | | R1132(E)/R1123 | (65/35) |
| refrigerant 71 | | R1132(E)/R1123/R1234yf | (70/20/10) |
| refrigerant 72 | | R1132(E)/R1123/R1234yf/ R32 | (60/5.7/20/14.3) |
| refrigerant 73 | | R1132(E)/R1234yf/R32 | (50/35.7/14.3) |
| refrigerant 74 | | R1132(E)/R1234yf/R32/ CO2 | (35.7/47/14.3/3) |
| refrigerant 75 | | R1132(E)/R1123/R32 | (30/55.7/14.3) |

Although the refrigeration cycle apparatus comprising the working fluid for the refrigerator, the working fluid comprising the refrigerant composition containing the refrigerant and the refrigerator oil containing the resin particles has been described earlier as an example of the embodiment of the present disclosure, the present disclosure also provides a refrigerant leakage prevention agent comprising the refrigerator oil which contains the resin particles. This refrigerant leakage prevention agent comprises the resin particles and the refrigerator oil of the present disclosure mentioned above, and may contain other component(s) if required.

This refrigerant leakage prevention agent may be supplied to and enclosed in a refrigerant circuit in advance, prior to the start of operation of a refrigeration cycle apparatus in a state where a working fluid for a refrigerator does not contain resin particles. This enclosed state corresponds to the refrigeration cycle apparatus comprising the working fluid for a refrigerator of the present disclosure. Then, when the operation of the refrigeration cycle apparatus is started, even if a hole that causes refrigerant leakage is formed in the refrigerant circuit, the resin particles that have been supplied in advance can quickly block the hole.

In another embodiment of the present disclosure, the refrigerant leakage prevention agent is injected into a refrigerant circuit after starting the operation of a refrigeration cycle apparatus in a state where a working fluid for a refrigerator does not contain resin particles. This injection can be performed by, for example, allowing the compressor of the outdoor unit to inhale it in accordance with JP 2013-139934 A.

In yet another embodiment of the present disclosure, when refrigerant leakage occurs or is suspected during the operation of a refrigeration cycle apparatus, the refrigerant leakage prevention agent is injected into a refrigerant circuit. The resin particles contained in the injected refrigerant leakage prevention agent enter a hole that may cause leakage, thereby preventing or suppressing refrigerant leakage.

Such a refrigerant leakage prevention agent may contain the resin particles in any appropriate content in the refrigerator oil. In the refrigerant leakage prevention agent, the content of the contained resin particles is, as the lower limit, preferably 0.01 parts by mass, more preferably 0.05 parts by mass, and still more preferably 0.1 parts by mass, relative to 100 parts by mass of the refrigerator oil. In addition, the content of the contained resin particles is, as the upper limit, preferably 50 parts by mass, more preferably 30 parts by mass, still more preferably 10 parts by mass, and particularly preferably 5 parts by mass, relative to 100 parts by mass of the refrigerator oil.

EXAMPLES

The present disclosure will be described more specifically by means of Examples and Comparative Examples below, but the present disclosure is not limited by such Examples.

Preparation of Resin Particles of Examples 1 to 6

An aqueous dispersion of a low molecular weight PTFE was obtained by the method described in Example 7 disclosed in International Publication No. WO 2009/020187. To 3,000 g of the obtained low molecular weight PTFE aqueous dispersion, 20 g of nitric acid was added and the mixture was subjected to intense stirring to coagulate, and then 20 g of a 24 mass % aqueous sodium hydroxide solution was added for neutralization, thereby obtaining PTFE resin powder in a wet state.

The obtained powder in the wet state was filtered out and washed with 1,800 g of pure water. By drying in a hot air circulating type drying machine at 160° C. for 18 hours, the low molecular weight PTFE was obtained as resin powder. Also, when required, the obtained resin powder was pulverized by a ball mill.

Adjustment of the particle size distribution of the low molecular weight PTFE resin powder used in Examples mentioned below was performed by appropriately selecting the stirring conditions at the time of coagulation (specifically, the number of rotations, temperature, and the like) and/or the pulverizing conditions of the obtained low molecular weight PTFE resin powder by the ball mill, and thereby obtaining the PTFE resin powders used in Examples 1 to 6.

Preparation of Resin Particles of Examples 7

Low molecular weight PTFE resin powder was obtained by the method described in Example 2 disclosed in International Publication No. WO 2018/026012.

<Measurement of Particle Size Distribution of Resin Powder>

The particle size distribution ($D_{10}$, $D_{50}$, and $D_{90}$) of the obtained resin powder was measured by using a laser diffraction particle size distribution measurement apparatus (HELOS & RODOS) manufactured by JEOL Ltd., not using a cascade, and carrying out the measurement at a dispersion pressure of 3.0 bar. The $D_{50}$ was used as the average particle size.

<Measurement of Content of Perfluorooctanoic Acid and Salt Thereof>

A liquid chromatograph-mass spectrometer (Waters, LC-MS ACQUITY UPLC/TQD) was used to measure the content of perfluorooctanoic acid and a salt thereof. To 1 g of the powder to be measured, 5 ml of acetonitrile was added, and the mixture was subjected to ultrasonication for 60 minutes to extract perfluorooctanoic acid. The obtained liquid phase was measured using the multiple reaction monitoring (MRM) method. As the mobile phase, acetonitrile (A) and an aqueous ammonium acetate solution (20 mmol/L) (B) were fed with a concentration gradient (A/B=40/60—2 min to 80/20—1 min). A separation column (ACQUITY UPLC BEH C18 1.7 μm) was used, and the column temperature and the injection volume were set to 40° C. and 5 μL, respectively. The ionization method used was ESI (electrospray ionization) Negative, the cone voltage was set to 25 V, and the precursor ion molecular weight/product ion molecular weight was measured to be 413/369. The content of perfluorooctanoic acid and a salt thereof was calculated using the external standard method. The detection limit in this measurement is 5 ppb.

<Measurement of Particle Size Distribution of Resin Particles in Refrigerator Oil>

A refrigerator oil containing resin particles (containing 0.5 parts by mass of resin particles relative to 100 parts by mass of a commercially available refrigerator oil (ether-based refrigerator oil)) was treated with an ultrasonic vibrator for 30 minutes to obtain a uniform dispersion, and then, the particle size distribution of the resin particles ($D_{10}$, $D_{50}$, and $D_{90}$, as well as standard deviation) was measured using a centrifugal sedimentation type particle size distribution measurement apparatus (CAPA-700, Horiba).

<Measurement of Refrigerant Leakage Ratio>

As the refrigeration cycle apparatus, an air conditioning apparatus (refrigerant R-410A: filling amount 0.75 kg, commercially available refrigerator oil (ether-based refrigerator oil): filling amount 0.3 L) was operated for cooling. The outdoor air temperature and the indoor temperature were both 40° C., and the refrigerant pressure was set to 3.2 MPa or more. The operation time was set to 150 hours.

A pipe part made of copper of the air conditioning apparatus (gas-side refrigerant connection pipe through which the evaporated refrigerant passes, which is connection pipe that connects the outdoor unit and the indoor unit) was kept in an environment (adjusted to a temperature of 40° C.

and a humidity of 90% or more) in which an aqueous formic acid solution (0.005 mass %) was present.

Before the start of the cooling operation, nitrogen pressure (3.2 MPa) was applied to the pipe part made of copper and the change in the nitrogen pressure over time was measured, and an amount of nitrogen leakage per unit time was calculated from the reduced pressure as the leakage rate. The copper pipe used for the measurement was one that had already been used (and thus may have a hole that may cause refrigerant leakage) and had a pre-operation leakage rate of 0.5 to 3.0 g—$N_2$/hr. After 150 hours of the operation, the refrigerant gas was removed from the relevant pipe part, and then the amount of nitrogen leakage from the pipe part made of copper was measured in the same manner to determine the post-operation leakage rate.

(Refrigerant leakage ratio)=[(Post-operation leakage rate)/(Pre-operation leakage rate)]×100(%)

Example 1

To 100 parts by mass of a commercially available refrigerator oil (ether-based refrigerator oil), 1.0 part by mass of the PTFE resin powder (average particle size of 4.2 μm) of Example 1 shown in Table 3 below, was added and mixed using a homogenizer, thereby obtaining a refrigerator oil of the present disclosure. Fifty milliliters of the obtained refrigerator oil was allowed to be inhaled into the compressor of the outdoor unit in accordance with JP 2013-139934 A to provide a refrigeration cycle apparatus of the present disclosure. This refrigeration cycle apparatus comprises the refrigerator oil of the present disclosure and refrigerant composition. Thereafter, the air conditioning apparatus was operated.

Example 2

The air conditioning apparatus was operated in the same manner as in Example 1 except that the PTFE resin powder (average particle size of 5.8 μm) of Example 2 shown in Table 3 below, was used instead of the PTFE resin powder of Example 1 and allowed to be inhaled.

Example 3

The air conditioning apparatus was operated in the same manner as in Example 1 except that the PTFE resin powder (average particle size of 5.8 μm) of Example 3 shown in Table 3 below, was used instead of the PTFE resin powder of Example 1 and allowed to be inhaled.

Example 4

The air conditioning apparatus was operated in the same manner as in Example 1 except that the PTFE resin powder (average particle size of 8.6 μm) of Example 4 shown in Table 3 below, was used instead of the PTFE resin powder of Example 1 and allowed to be inhaled.

Example 5

The air conditioning apparatus was operated in the same manner as in Example 1 except that the PTFE resin powder (average particle size of 6.2 μm) of Example 5 shown in Table 3 below, was used instead of the PTFE resin powder of Example 1 and allowed to be inhaled.

Example 6

The air conditioning apparatus was operated in the same manner as in Example 1 except that the PTFE resin powder (average particle size of 7.1 μm) of Example 6 shown in Table 3 below, was used instead of the PTFE resin powder of Example 1 and allowed to be inhaled.

Example 7

The air conditioning apparatus was operated in the same manner as in Example 1 except that the PTFE resin powder (average particle size of 4.3 μm) of Example 7 shown in Table 3 below, was used instead of the PTFE resin powder of Example 1 and allowed to be inhaled.

Comparative Example 1

The air conditioning apparatus was operated in the same manner as in Example 1 except that PTFE resin powder (L-2 manufactured by Daikin Industries, Ltd., average particle size of 1.3 μm) of Comparative Example 1 shown in Table 3 below, was used instead of the PTFE resin powder of Example 1 and allowed to be inhaled.

Comparative Example 2

The air conditioning apparatus was operated in the same manner as in Example 1 except that PTFE resin powder (8N manufactured by Kitamura Ltd., average particle size of 4.3 μm) of Comparative Example 2 shown in Table 3 below, was used instead of the PTFE resin powder of Example 1 and allowed to be inhaled.

Comparative Example 3

The air conditioning apparatus was operated in the same manner as in Example 1 except that PTFE resin powder (5GR manufactured by Heroflon S.p.A., average particle size of 6.0 μm) of Comparative Example 3 shown in Table 3 below, was used instead of the PTFE resin powder of Example 1 and allowed to be inhaled.

The measurement results of the particle size distributions of the resin powders and resin particles used in Examples and Comparative Examples, as well as the refrigerant leakage ratios, are shown in Table 3 and Table 4 below.

TABLE 3

| | particle size distribution of resin powder | | | content |
|---|---|---|---|---|
| | $D_{10}$ μm | $D_{50}$ μm | $D_{90}$ μm | of PFOA ppb |
| Example 1 | 1.2 | 4.2 | 8.4 | <5 |
| Example 2 | 1.7 | 5.8 | 13.0 | <5 |
| Example 3 | 2.3 | 5.8 | 11.4 | <5 |
| Example 4 | 3.1 | 8.6 | 17.0 | <5 |
| Example 5 | 1.6 | 6.2 | 14.6 | <5 |
| Example 6 | 1.7 | 7.1 | 21.3 | <5 |
| Example 7 | 1.5 | 4.3 | 12.8 | <5 |
| Comparative Example 1 | 0.3 | 1.3 | 3.1 | 166 |
| Comparative Example 2 | 0.5 | 4.3 | 8.3 | 132 |
| Comparative Example 3 | 3.3 | 6.0 | 9.5 | 505 |

TABLE 4

| | particle size distribution of resin particles in refrigerator oil | | | | | refrigerant |
|---|---|---|---|---|---|---|
| | $D_{10}$ μm | $D_{50}$ μm | $D_{90}$ μm | $D_{90}/D_{10}$ — | standard deviation μm | leakage ratio % |
| Example 1 | 1.3 | 4.1 | 8.4 | 6.5 | 3.4 | 0.9 |
| Example 2 | 1.8 | 5.7 | 13.1 | 7.5 | 5.8 | 0.5 |
| Example 3 | 2.3 | 5.8 | 11.5 | 5.0 | 4.9 | 0.5 |
| Example 4 | 3.2 | 8.7 | 17.1 | 5.3 | 6.9 | 0.7 |
| Example 5 | 1.5 | 6.2 | 14.6 | 9.7 | 5.5 | 0.3 |
| Example 6 | 1.7 | 7.2 | 21.4 | 12.6 | 7.1 | 0.4 |
| Example 7 | 1.6 | 4.4 | 12.8 | 8.0 | 9.0 | 0.4 |
| Comparative Example 1 | 0.4 | 1.4 | 3.2 | 7.5 | 1.4 | 3.0 |
| Comparative Example 2 | 0.5 | 4.3 | 8.3 | 15.6 | 2.0 | 1.3 |
| Comparative Example 3 | 3.3 | 5.9 | 9.5 | 2.9 | 2.6 | 1.8 |

As is evident from Table 4 above, it can be seen that the use of the resin particles with the specific particle size distribution of the present disclosure can suppress the leakage of the refrigerant more efficiently.

INDUSTRIAL APPLICABILITY

The refrigeration cycle apparatus, refrigerator oil, and refrigerant leakage prevention agent of the present disclosure are suitable for suppressing or preventing refrigerant leakage.

REFERENCE SIGN LIST

1 Air conditioning apparatus
2 Outdoor unit
3 Indoor unit
4 Compressor
5 Outdoor heat exchanger
6 Expansion valve
7 Outdoor heat exchanger
8 Gas-side refrigerant connection pipe
9 Liquid-side refrigerant connection pipe
10 Refrigerant circuit or four-way switching valve
11 Accumulator
12 Outdoor fan
13 Indoor fan
14 Liquid-side shut-off valve
15 Gas-side shut-off valve

What is claimed is:

1. A refrigeration cycle apparatus comprising a working fluid for a refrigerator, the working fluid comprising:

a refrigerator oil comprising polytetrafluoroethylene particles having a $D_{50}$ of 2.0 μm to 10.0 μm, a $D_{90}/D_{10}$ of 4.0 to 14.0, and a melt viscosity at 380° C. of $1\times10^2$ to $7\times10^5$ Pa·s; and a refrigerant composition comprising a refrigerant, wherein a particle size distribution of the polytetrafluoroethylene resin particles has a standard deviation of 3.0 μm to 8.0 μm.

2. A refrigerant leakage prevention agent comprising a refrigerator oil which comprises polytetrafluoroethylene resin particles having a $D_{50}$ of 2.0 μm to 10.0 μm, a $D_{90}/D_{10}$ of 4.0 to 14.0 μm, and a melt viscosity at 380° C. of $1\times10^2$ to $7\times10^5$ Pa·s, wherein a particle size distribution of the polytetrafluoroethylene resin particles has a standard deviation of 3.0 μm to 8.0 μm.

* * * * *